(12) United States Patent
Furuta

(10) Patent No.: US 11,897,301 B2
(45) Date of Patent: Feb. 13, 2024

(54) VEHICLE TRAVEL STATE CONTROL DEVICE AND VEHICLE TRAVEL STATE CONTROL METHOD

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 428 days.

(21) Appl. No.: 17/339,523

(22) Filed: Jun. 4, 2021

(65) Prior Publication Data

US 2021/0379956 A1 Dec. 9, 2021

(30) Foreign Application Priority Data

Jun. 8, 2020 (JP) ................. 2020-099163

(51) Int. Cl.
*B60G 17/0165* (2006.01)

(52) U.S. Cl.
CPC .. *B60G 17/0165* (2013.01); *B60G 2400/0511* (2013.01); *B60G 2400/104* (2013.01); *B60G 2400/821* (2013.01); *B60G 2500/104* (2013.01)

(58) Field of Classification Search
CPC ........ B60G 17/0165; B60G 2400/0511; B60G 2400/104; B60G 2400/821; B60G 2500/104
USPC .......................................................... 701/38
See application file for complete search history.

(56) References Cited

U.S. PATENT DOCUMENTS

| 5,078,421 | A  | * | 1/1992  | Kokubo  | B60G 17/0185 280/5.509 |
|---|---|---|---|---|---|
| 6,366,841 | B1 | * | 4/2002  | Ohsaku  | B60G 17/0152 280/5.515 |
| 6,502,023 | B1 | * | 12/2002 | Fukada  | B60G 17/0162 701/72 |
| 8,086,377 | B2 | * | 12/2011 | Itagaki | B60G 17/08 701/37 |
| 8,744,681 | B2 | * | 6/2014  | Liu     | B60G 17/015 701/38 |
| 9,415,657 | B2 | * | 8/2016  | Kikuchi | B60G 17/06 |

(Continued)

FOREIGN PATENT DOCUMENTS

| DE | 102016101283 A1 | 8/2016 |
|---|---|---|
| DE | 102017206055 A1 | 10/2017 |

(Continued)

*Primary Examiner* — Logan M Kraft
*Assistant Examiner* — John D Bailey
(74) *Attorney, Agent, or Firm* — Dinsmore & Shohl LLP

(57) ABSTRACT

A control unit is configured to execute vibration suppression control, in which the control force generation device is controlled based on a target vibration suppression control force when a wheel passes through a predicted wheel passage position, and roll control, in which the control force generation device is controlled based on a target roll control force for reducing roll of the sprung portion based on a roll index value. When the vibration suppression control and the roll control are executed concurrently, the control force generation device is controlled based on the target vibration suppression control force and the target roll control force (Continued)

obtained after at least one of a reduction correction for the target vibration suppression control force and an increase correction for the target roll control force is performed.

6 Claims, 15 Drawing Sheets

(56) References Cited

U.S. PATENT DOCUMENTS

| | | | | |
|---|---|---|---|---|
| 2008/0054540 | A1* | 3/2008 | Buma | B60G 17/0162 267/195 |
| 2009/0008887 | A1* | 1/2009 | Buma | B60G 17/0164 280/5.511 |
| 2010/0164189 | A1* | 7/2010 | Buma | B60G 17/0162 280/5.521 |
| 2010/0324780 | A1* | 12/2010 | Koumura | B60G 21/0555 701/38 |
| 2012/0046829 | A1* | 2/2012 | Ogawa | B60G 17/016 701/37 |
| 2012/0078470 | A1* | 3/2012 | Hirao | B60W 10/22 701/1 |
| 2013/0166149 | A1* | 6/2013 | Liu | B60G 17/015 701/37 |
| 2014/0001717 | A1* | 1/2014 | Giovanardi | B60G 17/0165 280/5.518 |
| 2014/0005888 | A1* | 1/2014 | Bose | B60G 17/0165 701/37 |
| 2014/0336894 | A1* | 11/2014 | Kikuchi | B60G 17/0165 701/70 |
| 2015/0046035 | A1* | 2/2015 | Kikuchi | B60G 17/0195 701/37 |
| 2015/0352920 | A1* | 12/2015 | Lakehal-Ayat | B60G 17/018 701/38 |
| 2016/0114644 | A1* | 4/2016 | Morita | B60W 30/20 701/37 |
| 2016/0229252 | A1 | 8/2016 | Lu et al. | |
| 2018/0113055 | A1* | 4/2018 | Kubota | B60G 17/018 |
| 2018/0154723 | A1 | 6/2018 | Anderson et al. | |
| 2018/0326809 | A1* | 11/2018 | Masamura | B60G 17/015 |

FOREIGN PATENT DOCUMENTS

| | | |
|---|---|---|
| JP | H05319066 A | 12/1993 |
| JP | H08040036 A | 2/1996 |
| JP | 2009-096366 A | 5/2009 |
| JP | 2016-107778 A | 6/2016 |

* cited by examiner

VEHICLE TRAVEL STATE CONTROL DEVICE AND VEHICLE TRAVEL STATE CONTROL METHOD

CROSS-REFERENCE TO RELATED APPLICATION

This application claims priority to Japanese Patent Application No. 2020-099163 filed on Jun. 8, 2020, incorporated herein by reference in its entirety.

BACKGROUND

1. Technical Field

The present disclosure relates to a vehicle travel state control device and a vehicle travel state control method.

2. Description of Related Art

In control for suppressing vibration of a sprung portion, as control for the travel state of a vehicle, a control force in the up-down direction generated between wheels and a vehicle body is controlled in order to suppress vibration of the sprung portion. Preview vibration suppression control described in Japanese Unexamined Patent Application Publication No. 5-319066 (JP 5-319066 A), for example, is known as control for suppressing vibration of a sprung portion of a vehicle. In the preview vibration suppression control, vibration of a sprung portion at the front wheel position and the rear wheel position is suppressed using road surface displacement in the up-down direction of a road surface ahead of the vehicle acquired by a preview sensor. With the preview vibration suppression control, vibration of the sprung portion can be suppressed effectively without a delay, compared to vibration suppression control performed based on the result of detecting a motion state amount in the up-down direction of the vehicle such as up-down acceleration of the sprung portion.

Preview vibration suppression control described in United States Patent Application Publication No. 2018/154723, for example, is also known as control for suppressing vibration of a sprung portion of a vehicle. The preview vibration suppression control is performed based on position information on the vehicle and preview reference data including road surface information (road surface information acquired in advance). The preview reference data are stored in a server with which the vehicle can communicate wirelessly. The road surface information included in the preview reference data includes a value that represents up-down displacement of a road surface (road surface displacement), and is generated based on sensing data acquired by a preview sensor such as a camera sensor, a Light Detection and Ranging (LIDAR) sensor, a radar, and a planar or three-dimensional scanning sensor.

Further, roll control in which a target roll control force for reducing roll of a sprung portion is computed based on a roll index value, which indicates the degree of roll of the sprung portion, when the roll index value is equal to or more than a reference value and a control force is controlled based on the target roll control force is also known as control for the travel state of a vehicle. With this type of roll control, roll of the sprung portion can be reduced and the operational stability of the vehicle can be improved, compared to the case where the control force is not controlled based on the target roll control force.

SUMMARY

Vibration suppression control and roll control in which a control force in the up-down direction generated between wheels and a vehicle body is controlled are occasionally executed concurrently in a vehicle capable of executing both the vibration suppression control and the roll control. A roll moment acts on the sprung portion when right and left control forces for the vibration suppression control are opposite in phase, even if the roll control is executed. Therefore, the amount of roll of the sprung portion during a turn of the vehicle may be increased compared to the case where vibration suppression control for the sprung portion is not performed.

In a situation in which the vibration suppression control and the roll control are executed concurrently, a roll index value is occasionally varied because of variations in the roll angle of the sprung portion and the rate of such variations due to the vibration suppression control. When the roll index value is reduced, in particular, the target roll control force may become short, and roll of the sprung portion may not be reduced effectively.

The present disclosure provides a vehicle travel state control device and a method capable of reducing roll of a sprung portion effectively, compared to the related art, in a situation in which vibration suppression control and roll control are executed concurrently.

An aspect of the present disclosure provides a vehicle travel state control device including: a control force generation device configured to generate a control force in an up-down direction for suppressing vibration of a sprung portion of a vehicle between at least a pair of right and left wheels and a vehicle body portion corresponding to positions of the wheels; a road surface displacement-related information acquisition device configured to acquire road surface displacement-related information related to up-down displacements of a road surface; a roll index value acquisition device configured to acquire a roll index value that indicates a degree of roll of the sprung portion; and a control unit configured to control the control force generation device based on at least one of the road surface displacement-related information and the roll index value.

The control unit is configured to execute vibration suppression control, in which predicted wheel passage positions through which the wheels are predicted to pass are determined, a target vibration suppression control force for reducing vibration of the sprung portion when the wheels pass through the predicted wheel passage positions is computed based on the road surface displacement-related information, and the control force generation device is controlled based on the target vibration suppression control force when the wheels pass through the predicted wheel passage positions, and roll control, in which a target roll control force for reducing roll of the sprung portion is computed based on the roll index value and the control force generation device is controlled based on the target roll control force.

The control unit is configured to control the control force generation device based on the target vibration suppression control force and the target roll control force which are obtained after performing at least one of a reduction correction for the target vibration suppression control force and an increase correction for the target roll control force when the vibration suppression control and the roll control are executed concurrently.

With the configuration described above, vibration of the sprung portion can be reduced, since vibration suppression control in which the control force generation device is controlled based on the target vibration suppression control force for reducing vibration of the sprung portion when the wheels pass through the predicted wheel passage positions is performed. In addition, roll of the sprung portion can be reduced, since roll control in which a target roll control force for reducing roll of the sprung portion is computed based on the roll index value and the control force generation device is controlled based on the target roll control force is performed.

When the vibration suppression control and the roll control are executed concurrently, further, the control force generation device is controlled based on the target vibration suppression control force and the target roll control force which are obtained after performing at least one of a reduction correction for the target vibration suppression control force and an increase correction for the target roll control force.

Hence, it is possible to reduce the possibility that roll of the sprung portion is degraded because of the control force for the vibration suppression control in a situation in which the vibration suppression control and the roll control are executed concurrently, compared to the case where neither of a reduction correction for the target vibration suppression control force and an increase correction for the target roll control force is performed.

In the aspect described above, the control unit may be configured to determine a reduction correction amount for the target vibration suppression control force based on the roll index value for the sprung portion such that the reduction correction amount for the target vibration suppression control force is larger as a magnitude of the roll index value for the sprung portion is larger.

With the aspect described above, the reduction correction amount for the target vibration suppression control force can be varied in accordance with the roll index value for the sprung portion such that the reduction correction amount for the target vibration suppression control force is larger as the magnitude of the roll index value for the sprung portion is larger. Hence, the control force for the vibration suppression control is reduced by a larger amount as the possibility that roll of the sprung portion becomes larger is higher. Thus, it is possible to appropriately reduce the possibility that roll of the sprung portion is degraded because of the control force for the vibration suppression control, compared to the case where the reduction correction amount for the target vibration suppression control force is constant.

In the aspect described above, the control unit may be configured to determine an increase correction amount for the target roll control force based on the roll index value for the sprung portion such that the increase correction amount for the target roll control force is larger as a magnitude of the roll index value for the sprung portion is larger.

With the aspect described above, the increase correction amount for the target roll control force can be varied in accordance with the roll index value for the sprung portion such that the increase correction amount for the target roll control force is larger as the magnitude of the roll index value for the sprung portion is larger. Hence, the effect of the roll control is increased by a larger amount as the possibility that roll of the sprung portion becomes larger is higher. Thus, it is possible to appropriately reduce the possibility that roll of the sprung portion is degraded because of the control force for the vibration suppression control, compared to the case where the increase correction amount for the target roll control force is constant.

In the aspect described above, the roll index value for the sprung portion may be one of an estimated lateral acceleration of the vehicle, an actual lateral acceleration of the vehicle, and a roll angle of the sprung portion.

With the aspect described above, at least one of the reduction correction for the target vibration suppression control force and the increase correction for the target roll control force can be performed based on one of the estimated lateral acceleration of the vehicle, the actual lateral acceleration of the vehicle, and the roll angle of the sprung portion.

In the aspect described above, the control unit may be configured to compute an index value for the vibration suppression control that indicates a magnitude of the control force for the vibration suppression control, and determine an increase correction amount for the target roll control force based on the index value for the vibration suppression control such that the increase correction amount for the target roll control force is larger as a magnitude of the index value for the vibration suppression control is larger.

With the aspect described above, the increase correction amount for the target roll control force can be varied in accordance with the index value for the vibration suppression control, which indicates the magnitude of the control force for the vibration suppression control, such that the increase correction amount for the target roll control force is larger as the index value for the vibration suppression control is larger. Hence, the effect of the roll control is increased by a larger amount as the possibility that roll of the sprung portion is degraded because of the vibration suppression control force is higher. Thus, it is possible to appropriately reduce the possibility that roll of the sprung portion is degraded because of the control force for the vibration suppression control, compared to the case where the increase correction amount for the target roll control force is constant.

Another aspect of the present disclosure provides a vehicle travel state control method of controlling a travel state of a vehicle by controlling a control force generation device configured to generate a control force in an up-down direction for suppressing vibration of a sprung portion of the vehicle between at least a pair of right and left wheels and a vehicle body portion corresponding to positions of the wheels.

The method includes: vibration suppression control including a step of acquiring road surface displacement-related information related to up-down displacements of a road surface, a step of determining predicted wheel passage positions through which the wheels are predicted to pass, a step of computing a target vibration suppression control force for reducing vibration of the sprung portion based on the road surface displacement-related information when the wheels pass through the predicted wheel passage positions, and a step of controlling the control force generation device based on the target vibration suppression control force when the wheels pass through the predicted wheel passage positions; and roll control including a step of acquiring a roll index value that indicates a degree of roll of the sprung portion, a step of computing a target roll control force for reducing the roll of the sprung portion based on the roll index value, and a step of controlling the control force generation device based on the target roll control force.

The control force generation device is controlled based on the target vibration suppression control force and the target roll control force which are obtained after performing at least one of a reduction correction for the target vibration suppression control force and an increase correction for the target roll control force when the vibration suppression control and the roll control are executed concurrently.

With the control method described above, vibration of the sprung portion can be reduced, since vibration suppression control in which the control force generation device is controlled based on the target vibration suppression control force for reducing vibration of the sprung portion when the wheels pass through the predicted wheel passage positions is performed. In addition, roll of the sprung portion can be reduced, since roll control in which a target roll control force for reducing roll of the sprung portion is computed based on the roll index value and the control force generation device is controlled based on the target roll control force is performed.

When the vibration suppression control and the roll control are executed concurrently, further, the control force generation device is controlled based on the target vibration suppression control force and the target roll control force which are obtained after performing at least one of a reduction correction for the target vibration suppression control force and an increase correction for the target roll control force. Hence, it is possible to reduce the possibility that roll of the sprung portion is degraded because of the control force for the vibration suppression control in a situation in which the vibration suppression control and the roll control are executed concurrently, compared to the case where neither of a reduction correction for the target vibration suppression control force and an increase correction for the target roll control force is performed.

The term "road surface displacement-related information" as used herein may refer to at least one of an unsprung displacement which represents an up-down displacement of an unsprung portion of the vehicle, an unsprung speed which is a time differential value of the unsprung displacement, a road surface displacement which represents the up-down displacement of a road surface, and a road surface displacement speed which is a time differential value of the road surface displacement. Further, the term "road surface displacement related values" may refer to one of the unsprung displacement which represents the up-down displacement of the unsprung portion of the vehicle and the road surface displacement which represents the up-down displacement of the road surface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Configuration

Figure 1:
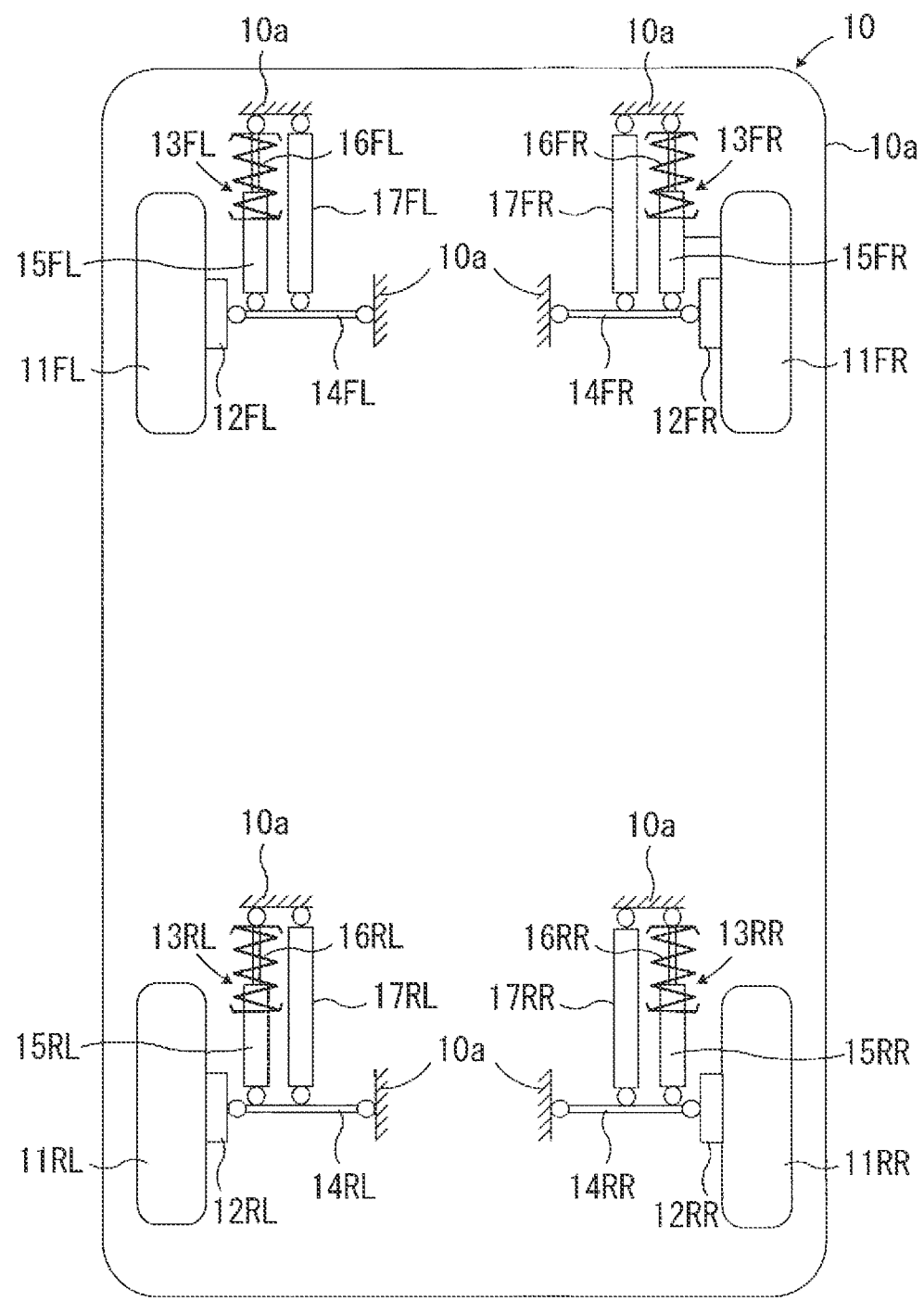
FIG. 1 illustrates a schematic configuration of a vehicle to which a travel state control device according to an embodiment of the present disclosure is applied.
Figure 2:
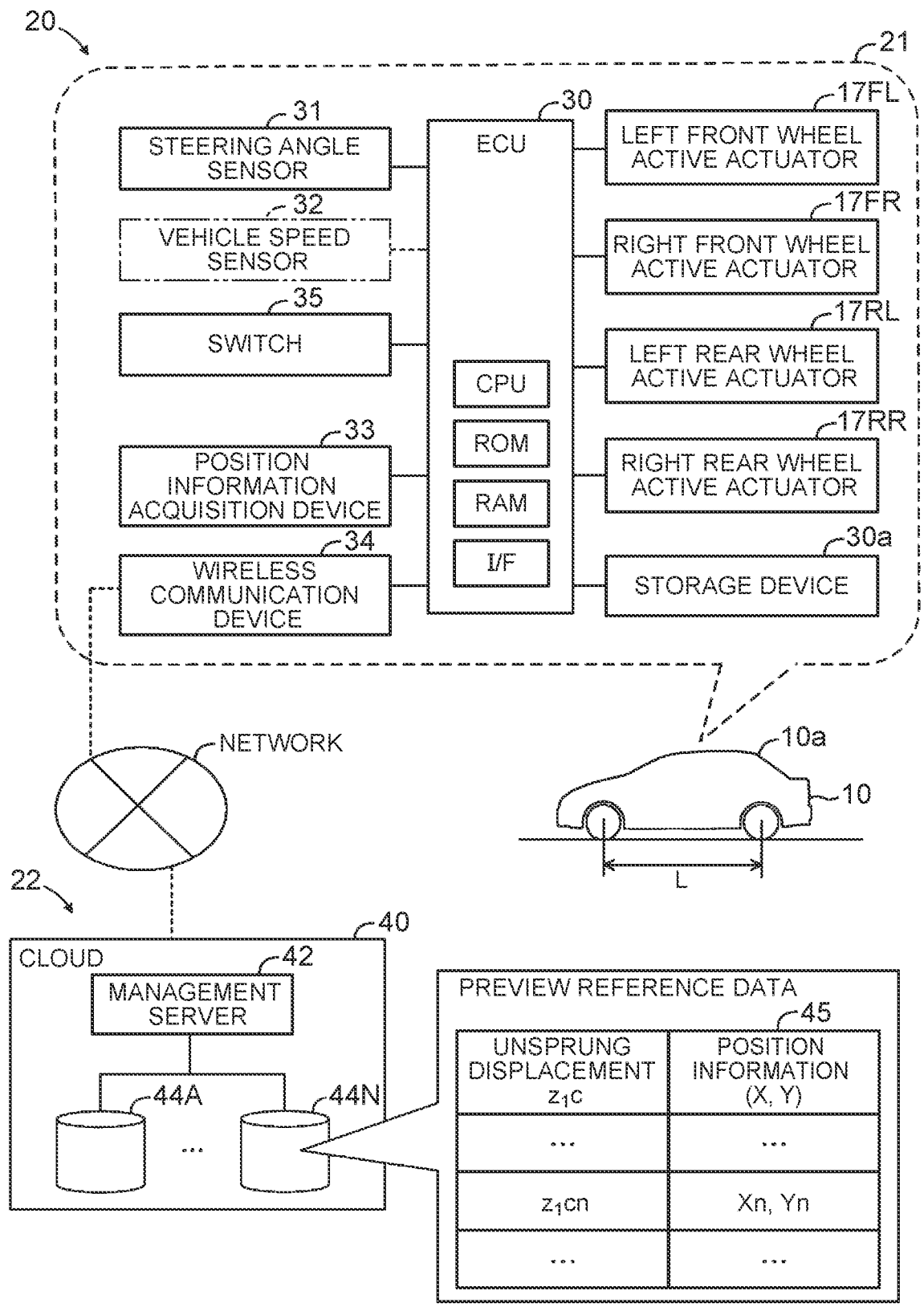
FIG. 2 illustrates a schematic configuration of a travel state control device according to a first embodiment of the present disclosure.

The entire vehicle travel state control device according to a first embodiment of the present disclosure is denoted by sign 20 in FIG. 2. The travel state control device 20 is applied to a vehicle 10 illustrated in FIG. 1.

The vehicle 10 includes a right front wheel 11FR, a left front wheel 11FL, a right rear wheel 11RR, and a left rear wheel 11RL. The left front wheel 11FL is rotatably supported by a wheel support member 12FL. The right front wheel 11FR is rotatably supported by a wheel support member 12FR. The left rear wheel 11RL is rotatably supported by a wheel support member 12RL. The right rear wheel 11RR is rotatably supported by a wheel support member 12RR.

The right front wheel 11FR, the left front wheel 11FL, the right rear wheel 11RR, and the left rear wheel 11RL are referred to as "wheels 11" when it is not necessary to differentiate them. Similarly, the right front wheel 11FR and the left front wheel 11FL are referred to as "front wheels 11F". Similarly, the right rear wheel 11RR and the left rear wheel 11RL are referred to as "rear wheels 11R". The wheel support members 12FL to 12RR are referred to as "wheel support members 12".

The vehicle 10 further includes a right front wheel suspension 13FR, a left front wheel suspension 13FL, a right rear wheel suspension 13RR, and a left rear wheel suspension 13RL. The suspensions 13FR to 13RL will be described in detail below. In some embodiments, the suspensions 13FR to 13RL are independent suspensions.

The left front wheel suspension 13FL suspends the left front wheel 11FL from a vehicle body 10a, and includes a suspension arm 14FL, a shock absorber 15FL, and a suspension spring 16FL. The right front wheel suspension 13FR suspends the right front wheel 11FR from the vehicle body 10a, and includes a suspension arm 14FR, a shock absorber 15FR, and a suspension spring 16FR.

The left rear wheel suspension 13RL suspends the left rear wheel 11RL from the vehicle body 10a, and includes a suspension arm 14RL, a shock absorber 15RL, and a suspension spring 16RL. The right rear wheel suspension 13RR suspends the right rear wheel 11RR from the vehicle body 10a, and includes a suspension arm 14RR, a shock absorber 15RR, and a suspension spring 16RR.

The right front wheel suspension 13FR, the left front wheel suspension 13FL, the right rear wheel suspension 13RR, and the left rear wheel suspension 13RL are referred to as "suspensions 13" when it is not necessary to differentiate them. Similarly, the suspension arms 14FL to 14RR are referred to as "suspension arms 14". Similarly, the shock absorbers 15FL to 15RR are referred to as "shock absorbers 15". Similarly, the suspension springs 16FL to 16RR are referred to as "suspension springs 16".

The suspension arm 14 couples the wheel support member 12 to the vehicle body 10a. While only one suspension arm 14 is illustrated for each suspension 13 in FIG. 1, a plurality of suspension arms 14 may be provided for each suspension 13.

The shock absorber 15 is disposed between the vehicle body 10a and the suspension arm 14, and coupled, at the upper end, to the vehicle body 10a and coupled, at the lower end, to the suspension arm 14. The suspension spring 16 is elastically mounted between the vehicle body 10a and the suspension arm 14 via the shock absorber 15. That is, the upper end of the suspension spring 16 is coupled to the vehicle body 10a, and the lower end of the suspension spring 16 is coupled to a cylinder of the shock absorber 15. When elastically mounting the suspension spring 16, the shock absorber 15 may be disposed between the vehicle body 10a and the wheel support member 12.

Further, while the shock absorber 15 is a shock absorber with a non-variable damping force in the present example, the shock absorber 15 may be a shock absorber with a variable damping force. Further, the suspension spring 16 may be elastically mounted between the vehicle body 10a and the suspension arm 14 not via the shock absorber 15. That is, the upper end of the suspension spring 16 may be coupled to the vehicle body 10a, and the lower end of the suspension spring 16 may be coupled to the suspension arm 14. When elastically mounting the suspension spring 16, the shock absorber 15 and the suspension spring 16 may be disposed between the vehicle body 10a and the wheel support member 12.

Figure 3:
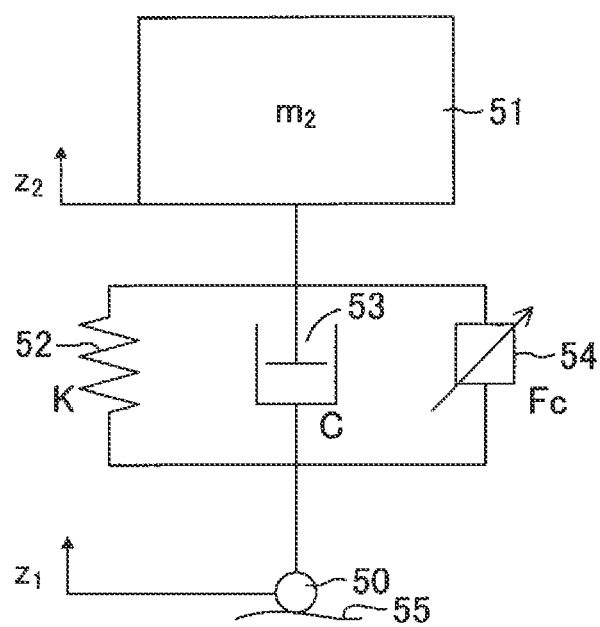
FIG. 3 illustrates a single-wheel model of the vehicle.

A portion of members such as the wheel 11 and the shock absorber 15 of the vehicle 10 that is on the side of the wheel 11 with respect to the suspension spring 16 is referred to as an "unsprung portion 50" (see FIG. 3). On the contrary, a portion of members such as the vehicle body 10a and the shock absorber 15 of the vehicle 10 that is on the side of the vehicle body 10a with respect to the suspension spring 16 is referred to as a "sprung portion 51" (see FIG. 3).

Further, a right front wheel active actuator 17FR, a left front wheel active actuator 17FL, a right rear wheel active actuator 17RR, and a left rear wheel active actuator 17RL are provided between the vehicle body 10a and the suspension arms 14FL to 14RR, respectively. The active actuators 17FR to 17RL are provided in parallel with the shock absorbers 15FL to 15RR and the suspension springs 16FL to 16RR, respectively.

The right front wheel active actuator 17FR, the left front wheel active actuator 17FL, the right rear wheel active actuator 17RR, and the left rear wheel active actuator 17RL are referred to as "active actuators 17" when it is not necessary to differentiate them. Similarly, the right front wheel active actuator 17FR and the left front wheel active actuator 17FL are referred to as "front wheel active actuators 17F". Similarly, the right rear wheel active actuator 17RR and the left rear wheel active actuator 17RL are referred to as "rear wheel active actuators 17R".

The active actuator 17 functions as an actuator that variably generates a force (hereinafter referred to as a "control force") Fc in the up-down direction that acts between the vehicle body 10a and the wheel 11 (between the sprung portion 51 and the unsprung portion 50), in order to suppress vibration of the sprung portion 51, based on a control instruction from an electronic control unit (hereinafter referred to as an "ECU" and occasionally referred to as a "control unit") 30 illustrated in FIG. 2. The active actuator 17 is occasionally referred to as a "control force generation device". In the present example, the active actuator 17 is an electromagnetic active actuator. The active actuator 17 constitutes an active suspension in cooperation with the shock absorber 15, the suspension spring 16, etc.

In the first embodiment, as illustrated in FIG. 2, the travel state control device 20 includes an in-vehicle device 21 and a vehicle-external device 22. The in-vehicle device 21 includes the ECU 30, a storage device 30a, a position information acquisition device 33, and a wireless communication device 34. The in-vehicle device 21 further includes the active actuators 17FR to 17RL discussed above.

The ECU 30 includes a microcomputer. The microcomputer includes a central processing unit (CPU), a read only memory (ROM), a random access memory (RAM), and an interface (I/F). The CPU implements various kinds of functions by executing instructions (programs and routines) stored in the ROM.

The ECU 30 is connected to the storage device 30a which is non-volatile and enables reading and writing of information. In the present example, the storage device 30a is a hard disk drive. The ECU 30 can store (save) information in the storage device 30a, and read information stored (saved) in the storage device 30a. The storage device 30a is not limited to a hard disk drive, and may be a known storage device or storage medium that enables reading and writing of information.

The in-vehicle device 21 further includes a steering angle sensor 31 and a switch 35. The steering angle sensor is an in-vehicle sensor connected to the ECU 30. The steering angle sensor 31 detects the rotational angle of a steering shaft of a steering device (not illustrated) as the amount of a steering operation by a driver. The switch 35 is operated by an occupant of the vehicle 10. The ECU 30 performs preview vibration suppression control, to be discussed later, when the switch 35 is ON.

Further, the ECU 30 is connected to the position information acquisition device 33 and the wireless communication device 34.

The position information acquisition device 33 includes a Global Navigation Satellite System (GNSS) receiver and a map database. The GNSS receiver receives an "artificial satellite signal (e.g. GNSS signal)" for detecting the position of the vehicle 10 at the present time (present position). The map database stores road map information etc. The position information acquisition device 33 is a device that acquires the present position (e.g. latitude and longitude) of the vehicle 10 based on the GNSS signal, and may be a navigation device, for example.

The ECU 30 acquires a vehicle speed V1 of the vehicle 10 and an advancing direction Td of the vehicle 10 at the present time based on a history of the present position acquired by the position information acquisition device 33.

The vehicle speed V1 may be detected by a vehicle speed sensor 32 as indicated by an imaginary line in FIG. 2.

The wireless communication device 34 is a wireless communication terminal that communicates information with a cloud 40 of the vehicle-external device 22 via a network. The cloud 40 includes a "management server 42 and a plurality of storage devices 44A to 44N" connected to the network. The one or more storage devices 44A to 44N are referred to as "storage devices 44" when it is not necessary to differentiate them. The storage device 44 functions as a vehicle-external storage device of the travel state control device 20.

The management server 42 includes a CPU, a ROM, a RAM, an interface (I/F), etc. The management server 42 searches for and reads data stored in the storage device 44, and writes data into the storage device 44.

The storage device 44 stores preview reference data 45. In the preview reference data 45, an unsprung displacement $z_1$ acquired based on the state amount of motion in the up-down direction of the vehicle 10 or a different vehicle detected when the vehicle 10 or the different vehicle actually travels on a road surface 55 is registered in correlation with information on the position at which the motion state amount is detected. Hence, the preview reference data 45 are data as a combination of the unsprung displacement $z_1$ acquired based on the state amount of motion in the up-down direction of the vehicle 10 or the different vehicle and information on the position at which the motion state amount is detected.

The unsprung portion 50 is displaced in the up-down direction upon receiving displacements of a road surface 55 when the vehicle 10 travels on the road surface 55. The unsprung displacement $z_1$ is a displacement in the up-down direction of the unsprung portion 50 corresponding to the position of each wheel 11 of the vehicle 10. The position information is "information that represents the position (e.g. latitude and longitude) of the wheel 11 at which the unsprung displacement $z_1$ is acquired" at the time when the unsprung displacement $z_1$ is acquired. In FIG. 2, an unsprung displacement "$z_1$cn" and position information "Xn, Yn" (n=1, 2, 3 . . . ) are indicated as examples of an unsprung displacement $z_1$c and the position information registered in correlation with the preview reference data 45.

Further, the ECU 30 is connected, via a drive circuit (not illustrated), to each of the right front wheel active actuator 17FR, the left front wheel active actuator 17FL, the right rear wheel active actuator 17RR, and the left rear wheel active actuator 17RL.

The ECU 30 computes a target vibration suppression control force Fct for suppressing vibration of the sprung portion 51 of each wheel 11 based on the unsprung displacement $z_1$ at a predicted passage position, to be discussed later, of the wheel 11, and controls the active actuator 17 such that a vibration suppression control force Fc generated by the active actuator 17 when the wheel 11 passes through the predicted passage position is equal to the target vibration suppression control force Fct.

Overview of Basic Preview Vibration Suppression Control

An overview of the preview vibration suppression control which is common to all the embodiments and executed by the travel state control device 20 will be described below. FIG. 3 illustrates a single-wheel model of the vehicle 10.

A spring 52 corresponds to the suspension spring 16. A damper 53 corresponds to the shock absorber 15. An actuator 54 corresponds to the active actuator 17.

In FIG. 3, the mass of the sprung portion 51 is denoted as a sprung mass $m_2$. A displacement in the up-down direction of the unsprung portion 50 discussed above is represented as the unsprung displacement $z_1$. Further, a displacement of the sprung portion 51 in the up-down direction is represented as a sprung displacement $z_2$. The sprung displacement $z_2$ is a displacement in the up-down direction of the sprung portion 51 corresponding to the position of each wheel 11. The spring constant (equivalent spring constant) of the spring 52 is denoted as a spring constant K. The damping coefficient (equivalent damping coefficient) of the damper 53 is denoted as a damping coefficient C. A force generated by the actuator 54 is denoted as a control force Fc.

Further, time differential values of $z_1$ and $z_2$ are denoted as $dz_1$ and $dz_2$, respectively, and second-order time differential values of $z_1$ and $z_2$ are denoted as $ddz_1$ and $ddz_2$, respectively. $z_1$ and $z_2$ are positive when an upward displacement is made. Positive signs are given when forces generated by the spring 52, the damper 53, the actuator 54, etc. are directed upward.

For the single-wheel model of the vehicle 10 illustrated in FIG. 3, the equation of motion for motion of the sprung portion 51 in the up-down direction can be represented by the formula (1).

$$m_2 ddz_2 = C(dz_1 - dz_2) + K(z_1 - z_2) - Fc \qquad (1)$$

It is assumed that the damping coefficient C in the formula (1) is constant. However, the actual damping coefficient is varied in accordance with the stroke speed of the suspension 13. Thus, the damping coefficient C may be set to be variable in accordance with the time differential value of a stroke H, for example.

Further, when vibration of the sprung portion 51 is completely canceled out by the vibration suppression control force Fc (i.e. when each of sprung portion acceleration $ddz_2$, a sprung portion speed $dz_2$, and the sprung displacement $z_2$ is zero), the vibration suppression control force Fc is represented by the formula (2).

$$Fc = Cdz_1 + Kz_1 \qquad (2)$$

Thus, the vibration suppression control force Fc which reduces vibration of the sprung portion 51 can be represented by the formula (3) using a control gain α. The control gain α is a desired constant that is more than 0 and equal to or less than 1.

$$Fc = \alpha(Cdz_1 + Kz_1) \qquad (3)$$

Further, when the formula (3) is applied to the formula (1), the formula (1) can be represented by the formula (4).

$$m_2 ddz_2 = C(dz_1 - dz_2) + K(z_1 - z_2) - \alpha(Cdz_1 + Kz_1) \qquad (4)$$

When the formula (4) is subjected to a Laplace transform and organized, the formula (4) is represented by the formula (5). That is, the transfer function for transfer from the unsprung displacement $z_1$ to the sprung displacement $z_2$ is represented by the formula (5). "s" in the formula (5) is a Laplace operator.

$$\frac{z_2}{z_1} = \frac{(1-\alpha)(Cs+K)}{m_2 s^2 + Cs + K} \qquad (5)$$

According to the formula (5), the value of the transfer function is varied in accordance with α, and the value of the transfer function becomes minimum when α is 1. Thus, the target vibration suppression control force Fct can be represented by the following formula (6) which corresponds to the formula (3). In the formula (6), a gain $\beta_1$ corresponds to $\alpha Cs$, and a gain $\beta_2$ corresponds to $\alpha K$.

$$Fct=\beta_1 \times dz_1 + \beta_2 \times z_1 \qquad (6)$$

Hence, the ECU 30 acquires in advance (pre-reads) the unsprung displacement $z_1$ at a position (predicted passage position) through which the wheel 11 will pass later, and computes the target vibration suppression control force Fct by applying the acquired unsprung displacement $z_1$ to the formula (6). Then, the ECU 30 causes the actuator 54 to generate a vibration suppression control force Fc corresponding to the target vibration suppression control force Fct at the timing when the wheel 11 passes through the predicted passage position (i.e. at the timing when the unsprung displacement $z_1$ applied to the formula (6) occurs). In this way, vibration of the sprung portion 51 caused when the wheel 11 passes through the predicted passage position (i.e. when the unsprung displacement $z_1$ applied to the formula (6) occurs) can be reduced.

The vibration suppression control for the sprung portion 51, which has been described above, is referred to as "preview vibration suppression control".

In the single-wheel model discussed above, the mass of the unsprung portion 50 and elastic deformation of the tire are ignored, and it is assumed that road surface displacement $z_0$ and the unsprung displacement $z_1$ are the same as each other. Thus, similar preview vibration suppression control may be executed using the road surface displacement $z_0$ in place of the unsprung displacement $z_1$.

Preview Vibration Suppression Control for Front Wheels and Rear Wheels

Next, preview vibration suppression control for the front wheels and the rear wheels, which is common to the embodiments, will be described with reference to FIGS. 4 to 6.

Figure 4:
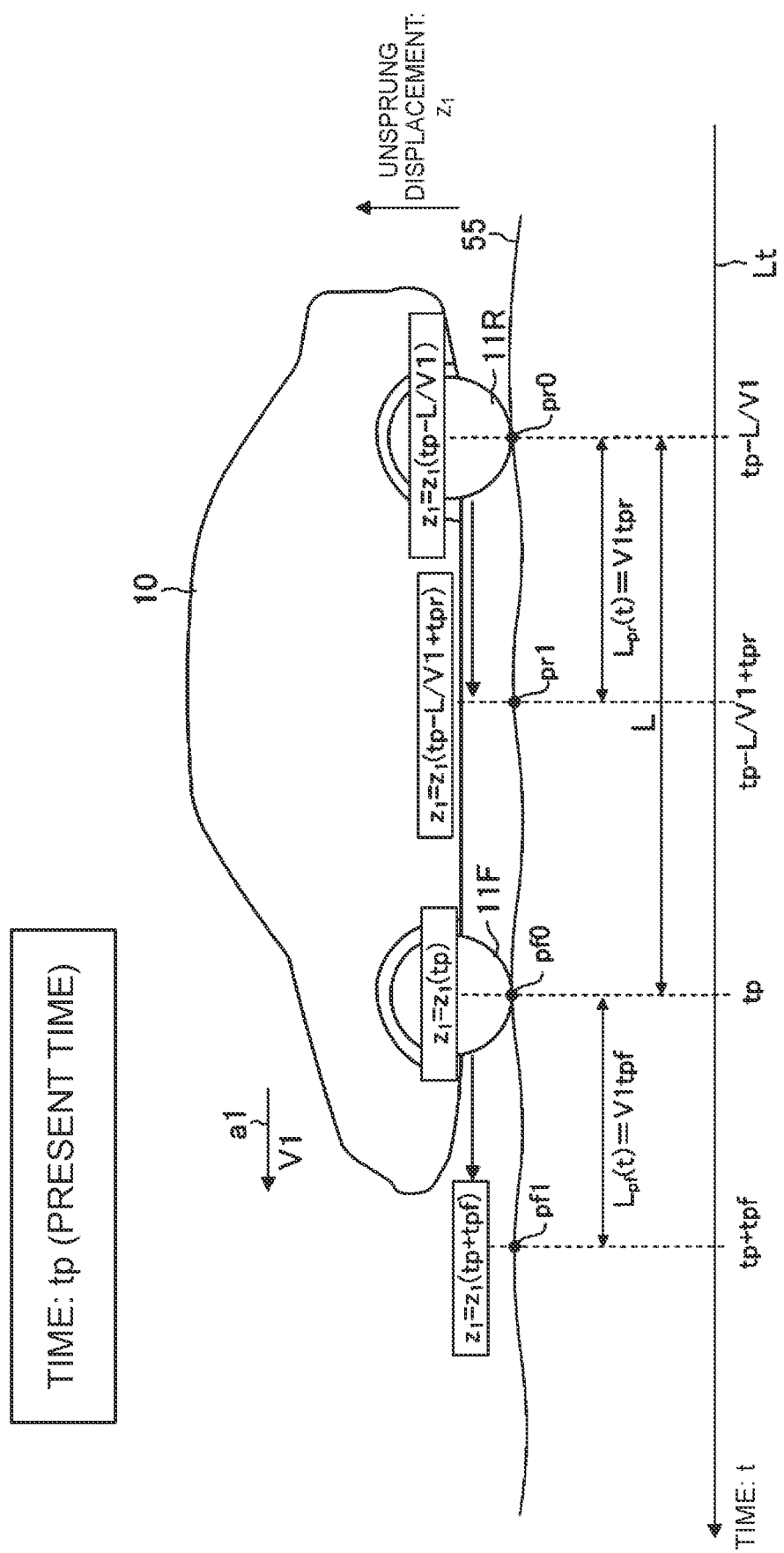
FIG. 4 is a diagram illustrating preview vibration suppression control.

FIG. 4 illustrates the vehicle 10 which is traveling at the vehicle speed V1 in the direction indicated by an arrow a1 at a present time tp. In the following description, the front wheel 11F and the rear wheel 11R are wheels on the same side, and the moving speed of the front wheel 11F and the rear wheel 11R is considered to be the same as the vehicle speed V1.

In FIG. 4, a line Lt is an imaginary time axis. The unsprung displacement $z_1$ on the course of movement of the front wheel 11F at present, past, and future times t is represented by a function $z_1(t)$ of an imaginary time axis t indicated by the line Lt. Hence, the unsprung displacement $z_1$ of the front wheel 11F at a position (ground contact point) pf0 at the present time tp is represented as $z_1(tp)$. Further, the unsprung displacement $z_1$ of the rear wheel 11R at a position pr0 at the present time tp is the unsprung displacement $z_1$ of the front wheel 11F at a time "tp−L/V1" which is earlier than the present time tp by a "time (L/V1) which is taken for the front wheel 11F to move a wheelbase length L". Hence, the unsprung displacement $z_1$ of the rear wheel 11R at the present time tp is represented as $z_1(tp-L/V1)$.

Preview Vibration Suppression Control for Front Wheels 11F

The ECU 30 specifies a predicted passage position pf1 of the front wheel 11F at a time which is later (future) than the present time tp by a front wheel pre-read time tpf. The front wheel pre-read time tpf is set in advance to a time taken since the ECU 30 specifies the predicted passage position pf1 until the front wheel active actuator 17F outputs a vibration suppression control force Fcf corresponding to a target vibration suppression control force Fcft.

The predicted passage position pf1 of the front wheel 11F is a position away from the position pf0 at the present time tp by a front wheel pre-read distance Lpf (=V1×tpf) along a predicted front wheel movement course which is a course along which the front wheel 11F is predicted to move in the future. The position pf0 is calculated based on the present position of the vehicle 10 acquired by the position information acquisition device 33 as discussed in detail later.

When the predicted front wheel passage position pf1 is specified, the ECU 30 acquires the unsprung displacement at the predicted passage position pf1 as an unsprung displacement $z_1(tp+tpf)$. Further, the ECU 30 computes a time differential value $dz_1(tp+tpf)$ of the unsprung displacement $z_1(tp+tpf)$. The acquisition of the unsprung displacement at the predicted front wheel passage position and a time differential value of the unsprung displacement differs among the embodiments. Thus, the manner of the acquisition will be described later.

The ECU 30 computes a front-wheel target vibration suppression control force Fcft by applying the unsprung displacement $z_1(tp+tpf)$ and the time differential value $dz_1(tp+tpf)$ to the following formula (7) corresponding to the above formula (6).

$$Fcft = \beta_1 f \times dz_1 + \beta_2 f \times z_1 \qquad (7)$$

Further, the ECU 30 transmits a control instruction including the target vibration suppression control force Fcft to the front wheel active actuator 17F, in order for the front wheel active actuator 17F to generate a vibration suppression control force Fcf corresponding to the target vibration suppression control force Fcft.

Figure 5:
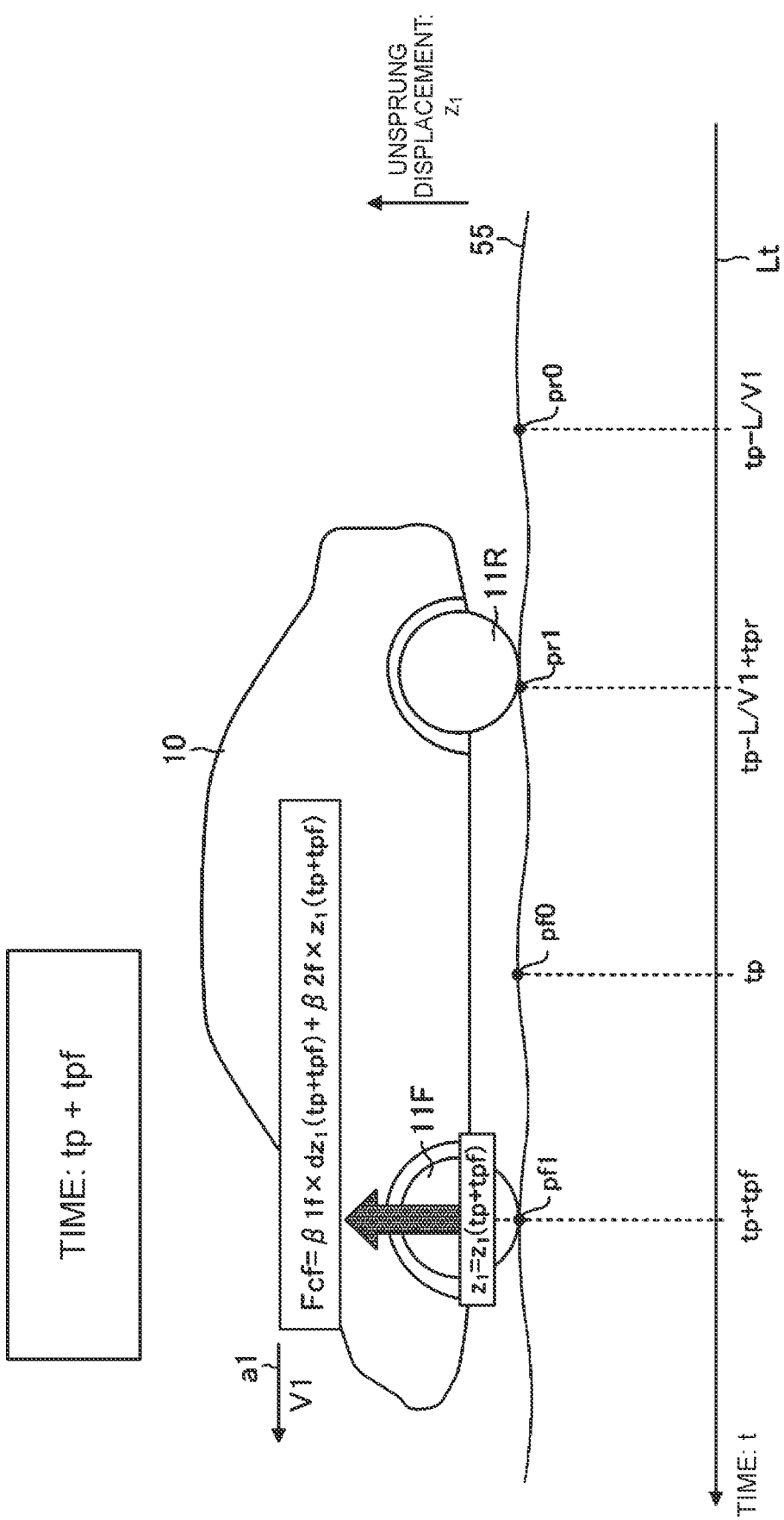
FIG. 5 is another diagram illustrating the preview vibration suppression control.

As illustrated in FIG. 5, the front wheel active actuator 17F generates a vibration suppression control force Fcf corresponding to the target vibration suppression control force Fcft at a "time tp+tpf" which is later than the present time tp by the front wheel pre-read time tpf (i.e. at the timing when the front wheel 11F actually passes through the predicted passage position pf1). Hence, the front wheel active actuator 17F can appropriately reduce vibration of the sprung portion 51 by generating, at an appropriate timing, a vibration suppression control force Fcf to absorb a vibration application force generated because of the unsprung displacement $z_1$ of the front wheel 11F at the predicted passage position pf1.

Preview Vibration Suppression Control for Rear Wheels 11R

The ECU 30 specifies a predicted passage position pr1 of the rear wheel 11R at a time which is later (future) than the present time tp by a rear wheel pre-read time tpr. The rear wheel pre-read time tpr is set in advance to a time taken since the ECU 30 specifies the predicted passage position pr1 until the rear wheel active actuator 17R outputs a vibration suppression control force Fcr corresponding to a target vibration suppression control force Fcrt.

When the front wheel active actuator 17F and the rear wheel active actuator 17R are different active actuators, the front wheel pre-read time tpf and the rear wheel pre-read time tpr are set to different values in advance. When the front wheel active actuator 17F and the rear wheel active actuator 17R are the same active actuators, the front wheel pre-read time tpf and the rear wheel pre-read time tpr are set to the same value in advance.

The ECU 30 specifies, as the predicted passage position pr1, a position away from a position at the present time tp by a rear wheel pre-read distance Lpr (=V1×tpr) along a predicted movement course of the rear wheel 11R for a case where the rear wheel 11R is assumed to follow the same course as the front wheel 11F. The unsprung displacement $z_1$ at the predicted passage position pr1 is the unsprung displacement $z_1$ at a time (tp−L/V1+tpr) which is later than the "time (tp−L/V1) when the front wheel 11F was positioned at the position pr0 at which the rear wheel 11R is positioned at the present time" by the rear wheel pre-read time tpr.

Hence, the ECU 30 acquires the unsprung displacement at the predicted rear wheel passage position pr1 as the unsprung displacement $z_1$(tp−L/V1+tpr). Further, the ECU 30 computes a time differential value $dz_1$(tp−L/V1+tpr) of the unsprung displacement $z_1$(tp−L/V1+tpr). The acquisition of the unsprung displacement at the predicted rear wheel passage position and a time differential value of the unsprung displacement differs among the embodiments. Thus, the manner of the acquisition will also be described later.

The ECU 30 computes a rear-wheel target vibration suppression control force Fcrt by applying the unsprung displacement $z_1$(tp−L/V1+tpr) and the time differential value $dz_1$(tp−L/V1+tpr) to the following formula (8) corresponding to the above formula (6).

$$Fcrt = \beta_1 r \times dz_1 + \beta_2 r \times z_1 \quad (8)$$

Further, the ECU 30 transmits a control instruction including the target vibration suppression control force Fcrt to the rear wheel active actuator 17R, in order for the rear wheel active actuator 17R to generate a vibration suppression control force Fcr corresponding to the target vibration suppression control force Fcrt.

Figure 6:
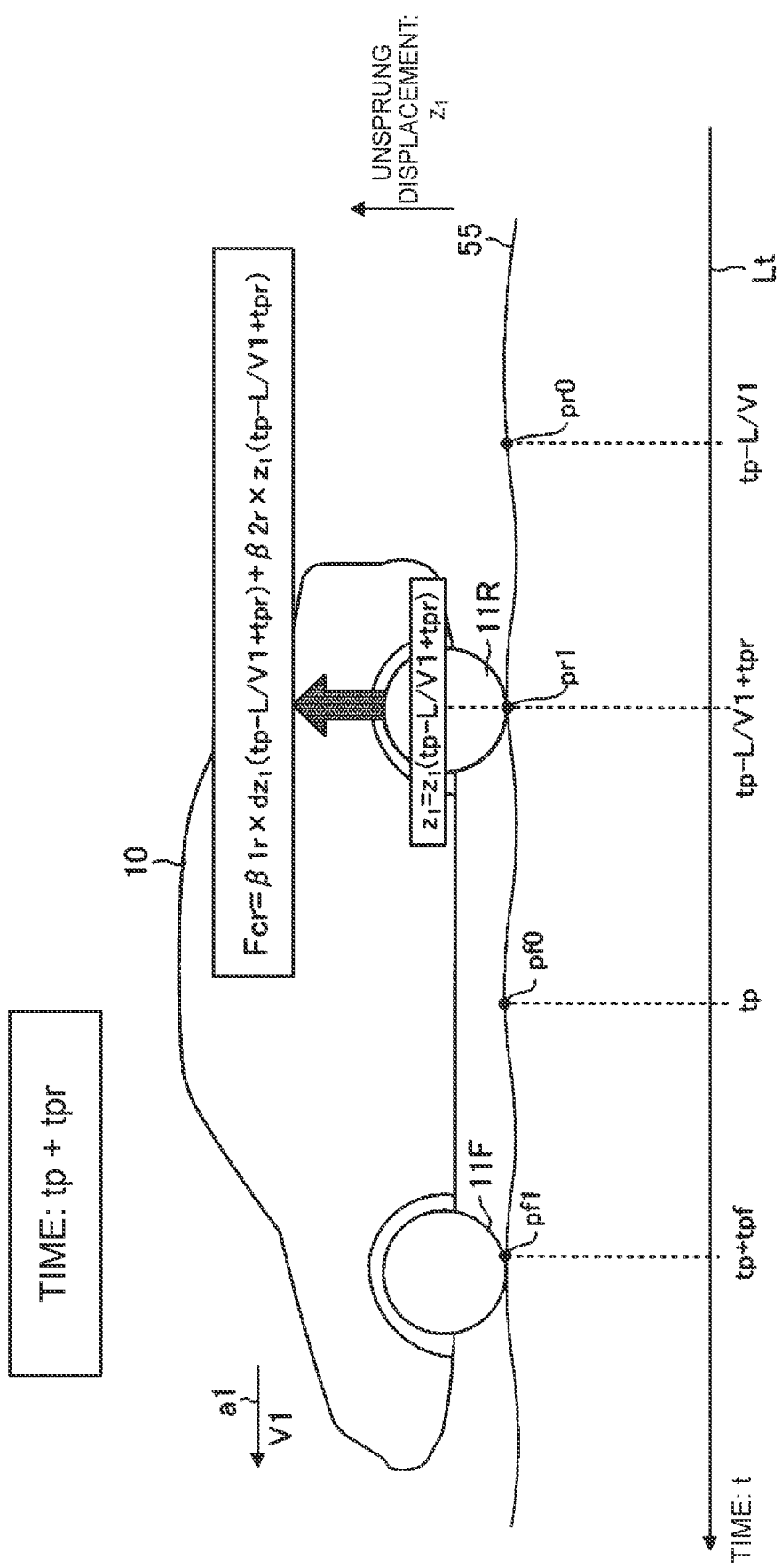
FIG. 6 is another diagram illustrating the preview vibration suppression control.

As illustrated in FIG. 6, the rear wheel active actuator 17R generates a vibration suppression control force Fcr corresponding to the target vibration suppression control force Fcrt at a "time tp+tpr" which is later than the present time tp by the rear wheel pre-read time tpr. Hence, the rear wheel active actuator 17R can appropriately reduce vibration of the sprung portion 51 by generating, at an appropriate timing, a vibration suppression control force Fcr to absorb a vibration application force generated because of the unsprung displacement $z_1$ of the rear wheel 11R at the predicted passage position pr1.

Roll Control

Next, roll control for the sprung portion, which is common to the embodiments, will be described. During a turn of the vehicle 10, the ECU 30 computes an estimated lateral acceleration Gyh of the vehicle based on the vehicle speed V1 and a steering angle θ in a manner known in the relevant technical field. The estimated lateral acceleration Gyh has a positive value when the vehicle is turning to the left. The ECU 30 computes a target roll control force Frit based on the absolute value of the estimated lateral acceleration Gyh of the vehicle such that the magnitude of an anti-roll moment due to the control force F generated by the active actuator 17 for each wheel is larger as the absolute value of the estimated lateral acceleration Gyh is larger.

Further, the ECU 30 controls the active actuator 17 for each wheel such that a roll control force Fri generated by the active actuator is equal to the corresponding target roll control force Frit. The symbol "i" corresponds to fr, fl, rr, and rl, which mean the right front wheel, the left front wheel, the right rear wheel, and the left rear wheel, respectively.

Travel State Control Routine According to First Embodiment

Figure 7:
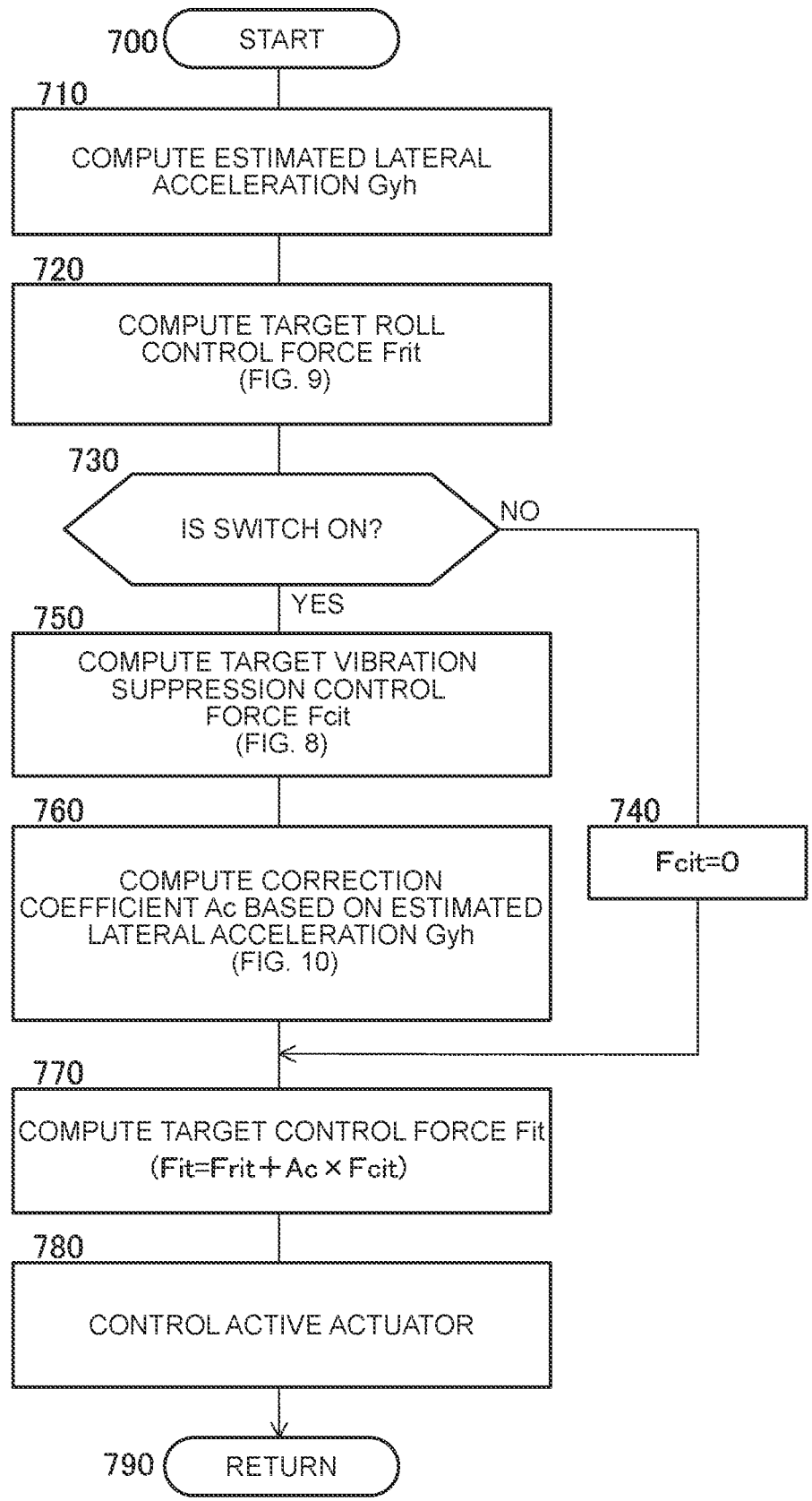
FIG. 7 is a flowchart illustrating a vehicle travel state control routine according to the first embodiment.
Figure 8:
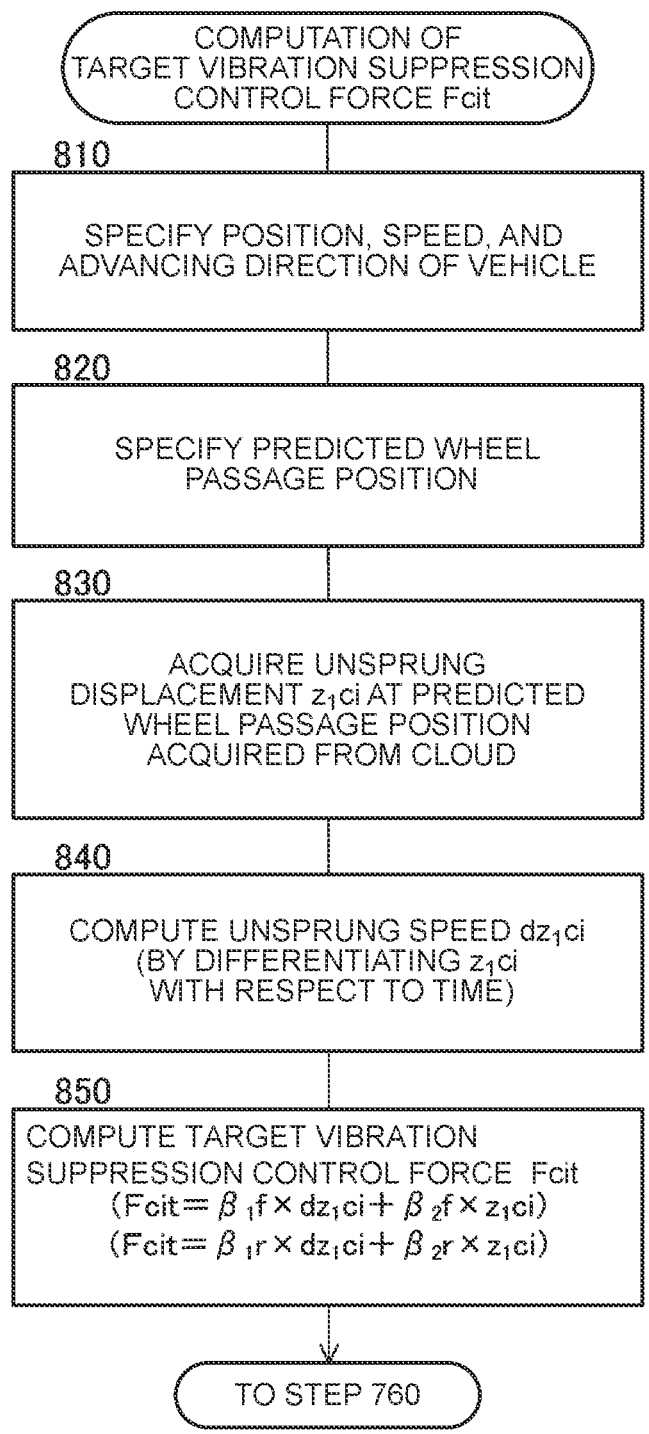
FIG. 8 is a flowchart illustrating a subroutine executed in step 750 in FIG. 7.

The CPU of the ECU 30 executes a vibration suppression control routine illustrated in the flowcharts in FIGS. 7 and 8 each time a predetermined time elapses. The term "CPU" refers to the CPU of the ECU 30 unless stated otherwise.

The CPU starts the process in step 700 in FIG. 7 at a predetermined timing, executes steps 710 to 780, and thereafter proceeds to step 790 to temporarily end the routine.

Step 710: the CPU specifies a vehicle speed V1 based on a GNSS signal which is received by the position information acquisition device 33 and which includes information about the moving speed. Further, the CPU computes an estimated lateral acceleration Gyh of the vehicle based on the vehicle speed V1 and the steering angle θ in a manner known in the relevant technical field.

Figure 9:
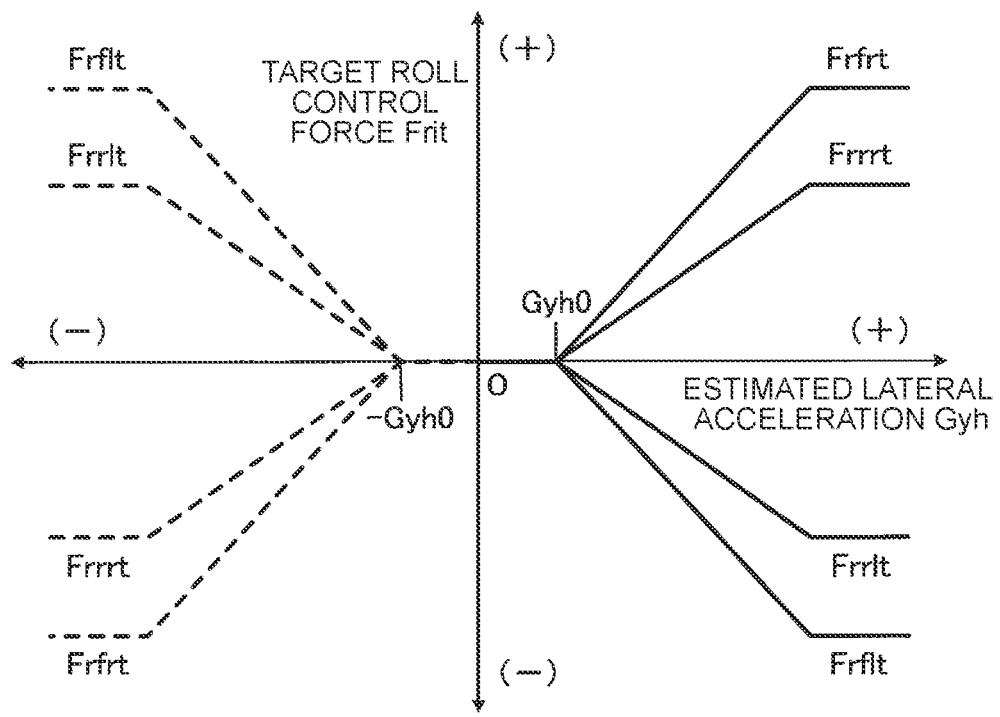
FIG. 9 illustrates a map for computing a target roll control force Frit based on an estimated lateral acceleration Gyh of the vehicle.

Step 720: the CPU computes a target roll control force Frit by referencing the map illustrated in FIG. 9 based on the absolute value of the estimated lateral acceleration Gyh. In FIG. 9, the continuous lines correspond to a map at the time when the estimated lateral acceleration Gyh is positive, and the dashed lines correspond to a map at the time when the estimated lateral acceleration Gyh is negative. In some embodiments, the ratio of the target roll control force for the front wheels and the target roll control force for the rear wheels corresponds to the ratio between a distance Lr and a distance Lf. The distance Lr is a distance between the center of gravity of the sprung portion and the axles of the rear wheels, and the distance Lf is a distance between the center of gravity of the sprung portion and the axles of the front wheels.

As indicated in FIG. 9, the target roll control force Frit is 0 when the absolute value of the estimated lateral acceleration Gyh is equal to or less than Gyh0 (a constant of 0 or more). When the absolute value of the estimated lateral acceleration Gyh is larger than Gyh0, the magnitude of the target roll control force Frit becomes larger as the absolute value of the estimated lateral acceleration Gyh becomes larger. Hence, the target roll control force Frit is computed such that the magnitude of an anti-roll moment due to the roll control force generated by the active actuator 17 for each wheel is larger as the absolute value of the estimated lateral acceleration Gyh of the vehicle is larger.

Step 730: the CPU determines whether the switch 35 is ON, and proceeds to step 750 when the switch 35 is ON, and proceeds to step 740 when the switch 35 is OFF.

Step 740: the CPU sets the target vibration suppression control force Fcit for all the wheels to 0.

Step 750: the CPU computes a target vibration suppression control force Fcit for each wheel in accordance with the computation control routine illustrated in FIG. 8.

Figure 10:
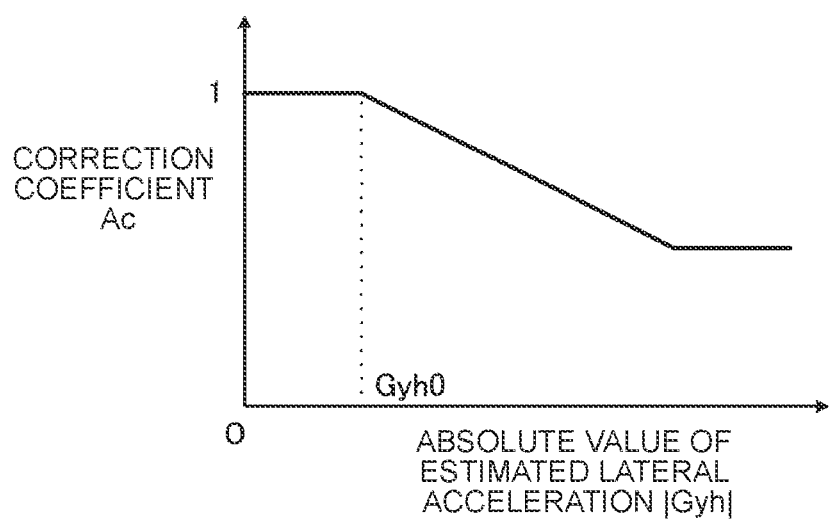
FIG. 10 illustrates a map for computing a correction coefficient Ac for a target vibration suppression control force Fcit based on the absolute value of the estimated lateral acceleration Gyh of the vehicle.

Step 760: the CPU computes a correction coefficient Ac for the target vibration suppression control force Fcit by referencing the map illustrated in FIG. 10 based on the estimated lateral acceleration Gyh of the vehicle. As indicated in FIG. 10, the correction coefficient Ac is 1 when the absolute value of the estimated lateral acceleration Gyh is equal to or less than Gyh0. The correction coefficient Ac is computed so as to have a positive value that becomes smaller as the absolute value of the estimated lateral acceleration Gyh becomes larger when the absolute value of the estimated lateral acceleration Gyh is larger than Gyh0.

Step 770: the CPU computes a target control force Fit for the active actuator 17 for each wheel in accordance with the following formula (9).

$$Fit = Frit + Ac \times Fcit \quad (9)$$

Step 780: the CPU controls the control force F generated by the active actuator 17 for each wheel to the target control force Fit by transmitting a control instruction including the target control force Fit to each active actuator. Each active actuator outputs a vibration suppression control force corresponding to the product of the correction coefficient Ac and the target vibration suppression control force Fcit at the timing when each wheel 11 passes through the corresponding predicted passage position.

Computation of Target Vibration Suppression Control Force Fcit in Step 750

Step 810: the CPU acquires information about the present position of the vehicle 10 from the position information acquisition device 33, and specifies (acquires) the present position of each wheel 11, the vehicle speed V1, and the advancing direction Td of the vehicle 10.

More particularly, the CPU maps a preceding present position and a current present position on road map information included in the map database, and specifies the direction from the preceding present position to the current present position as the advancing direction Td of the vehicle 10. The preceding present position means the present position of the vehicle 10 acquired by the CPU in step 710 in the preceding execution of the routine. Further, the current present position means the present position of the vehicle 10 acquired by the CPU in current step 710.

The ROM of the ECU 30 stores in advance position relationship data that represents the relationship between the mounting position of the GNSS receiver in the vehicle 10 and the position of each wheel 11. The present position of the vehicle 10 acquired from the position information acquisition device 33 corresponds to the mounting position of the GNSS receiver, and therefore the CPU specifies the present position of each wheel 11 by referencing the present position of the vehicle 10, the advancing direction Td of the vehicle 10, and the position relationship data described above. Further, the CPU specifies the vehicle speed V1 based on the GNSS signal.

Step 820: the CPU specifies a predicted front wheel movement course and a predicted rear wheel movement course as stated below.

The CPU specifies, as predicted right and left front wheel movement courses, courses along which the right and left front wheels 11FR and 11FL are predicted to move when the vehicle 10 travels along the advancing direction Td based on the present position of each wheel 11, the advancing direction Td of the vehicle 10, and the position relationship data described above.

The predicted right and left rear wheel movement courses include a "first predicted course from the present position of the right and left rear wheels 11RR and 11RL to the present position of the front wheels 11FR and 11FL, respectively," and a "second predicted course on the side of the advancing direction of the vehicle 10 with respect to the present position of the front wheels 11FR and 11FL". Thus, the CPU specifies, as the first predicted course, a path along which the right and left front wheels 11FR and 11FL are actually moved from the present position of the rear wheels 11RR and 11RL to the present position of the right and left front wheels. Further, the CPU specifies the predicted right and left front wheel movement courses described above as the second predicted course of the right and left rear wheels 11RR and 11RL, respectively.

The CPU computes a front wheel pre-read distance Lpf by multiplying the vehicle speed V1 by the front wheel pre-read time tpf, and computes a rear wheel pre-read distance Lpr by multiplying the vehicle speed V1 by the rear wheel pre-read time tpr, as discussed above. Further, the CPU specifies a predicted front wheel passage position pf1 and a predicted rear wheel passage position pr1.

More specifically, the CPU specifies, as predicted right and left front wheel passage positions pfr1 and pfl1, positions ahead of the present position of the right and left front wheels 11FR and 11FL by the front wheel pre-read distance Lpf along the predicted right and left front wheel passage courses. Further, the CPU specifies, as predicted right and left rear wheel passage positions prr1 and prl1, positions ahead of the present position of the right and left rear wheels 11RR and 11RL by the rear wheel pre-read distance Lpr along the predicted right and left rear wheel passage courses.

Step 830: the CPU acquires information on the unsprung displacement $z_1 ci$ at the predicted front wheel passage position from the unsprung displacement in a "preparation section" acquired beforehand from the preview reference data 45 in the cloud 40.

The preparation section is a section that starts at the predicted front wheel passage position pf1 at the time when the end point of the preparation section is reached and that ends at a position away from the predicted front wheel passage position pf1 by a predetermined preparation distance along the predicted front wheel movement course. Further, the preparation distance is determined in advance to have a value that is large enough compared to the front wheel pre-read distance Lpf.

Step 840: the CPU computes an unsprung speed $dz_1 ci$ by differentiating the unsprung displacement $z_1 ci$ with respect to the time.

Step 850: the CPU computes target vibration suppression control forces Fcfrt, Fcflt, Fcrrt, and Fcrlt for the active actuators for the right and left front wheels and the right and left rear wheels based on the unsprung speed $dz_1 ci$ and the unsprung displacement $z_1 ci$ using the following formulas (10) and (11) corresponding to the above formulas (7) and (8), respectively.

$$Fcit = \beta_1 f \times dz_1 ci + \beta_2 f \times z_1 ci \quad (10)$$

$$Fcit = \beta_1 r \times dz_1 ci + \beta_2 r \times z_1 ci \quad (11)$$

The gains $\beta_1 f$ and $\beta_2 f$ and the gains $\beta_1 r$ and $\beta_2 r$ in the formulas (10) and (11) are expressed as mutually different values. This is because such values are determined in consideration of the fact that the damping coefficients Cf and Cr of the shock absorbers for the front wheels and the rear wheels are occasionally different from each other and that spring constants Kf and Kr of the suspensions for the front wheels and the rear wheels are occasionally different from each other.

With the first embodiment, as is understood from what has been described above, the ECU 30 of the travel state control device 20 performs a reduction correction on the target vibration suppression control force for the preview vibration suppression control when the preview vibration suppression control and the roll control are executed concurrently. Hence, even when the preview vibration suppression control and the roll control are executed concurrently, it is possible to reduce the possibility that roll of the sprung portion is degraded because of the vibration suppression control force for the preview vibration suppression control, compared to the case where a reduction correction is not performed on the target vibration suppression control force for the preview vibration suppression control.

With the first embodiment, in particular, the correction coefficient Ac for performing a reduction correction on the target vibration suppression control force for the preview vibration suppression control is computed so as to be smaller as the absolute value of the estimated lateral acceleration Gyh, which is a roll index value, is larger. Thus, the control force for the vibration suppression control is reduced by a larger amount as the possibility that roll of the sprung portion becomes larger is higher. Thus, it is possible to appropriately reduce the possibility that roll of the sprung portion is degraded because of the control force for the vibration suppression control, compared to the case where the correction coefficient Ac is constant and the reduction correction amount for the target vibration suppression control force is constant.

In the first embodiment, further, the roll index value is the estimated lateral acceleration Gyh which is varied temporally earlier than the actual lateral acceleration of the vehicle. Hence, it is possible to reduce a delay in the reduction correction for the target vibration suppression control force with respect to variations in the centrifugal force of the vehicle which vary the amount of roll of the sprung portion, compared to the case where the roll index value is the actual lateral acceleration of the vehicle.

In the first embodiment, the correction coefficient Ac for performing a reduction correction on the target vibration suppression control force for the preview vibration suppression control is computed based on the estimated lateral acceleration Gyh which is the roll index value, and a reduction correction is performed on the target vibration suppression control force by multiplying the target vibration suppression control force by the correction coefficient Ac. However, a reduction correction amount ΔFcit for the target vibration suppression control force Fcit may be computed based on the roll index value and the target vibration suppression control force, and the target control force Fit may be computed by subtracting the reduction correction amount ΔFcit from the sum of the target roll control force Frit and the target vibration suppression control force Fcit.

In the first embodiment, the estimated lateral acceleration Gyh which is the roll index value is computed based on the vehicle speed V1 and the steering angle θ. However, the estimated lateral acceleration Gyh may be computed as the product of the yaw rate of the vehicle which is detected by a yaw rate sensor or the yaw rate of the vehicle which is computed based on the wheel speeds of the right and left wheels, and the vehicle speed V1.

Second Embodiment

Figure 11:
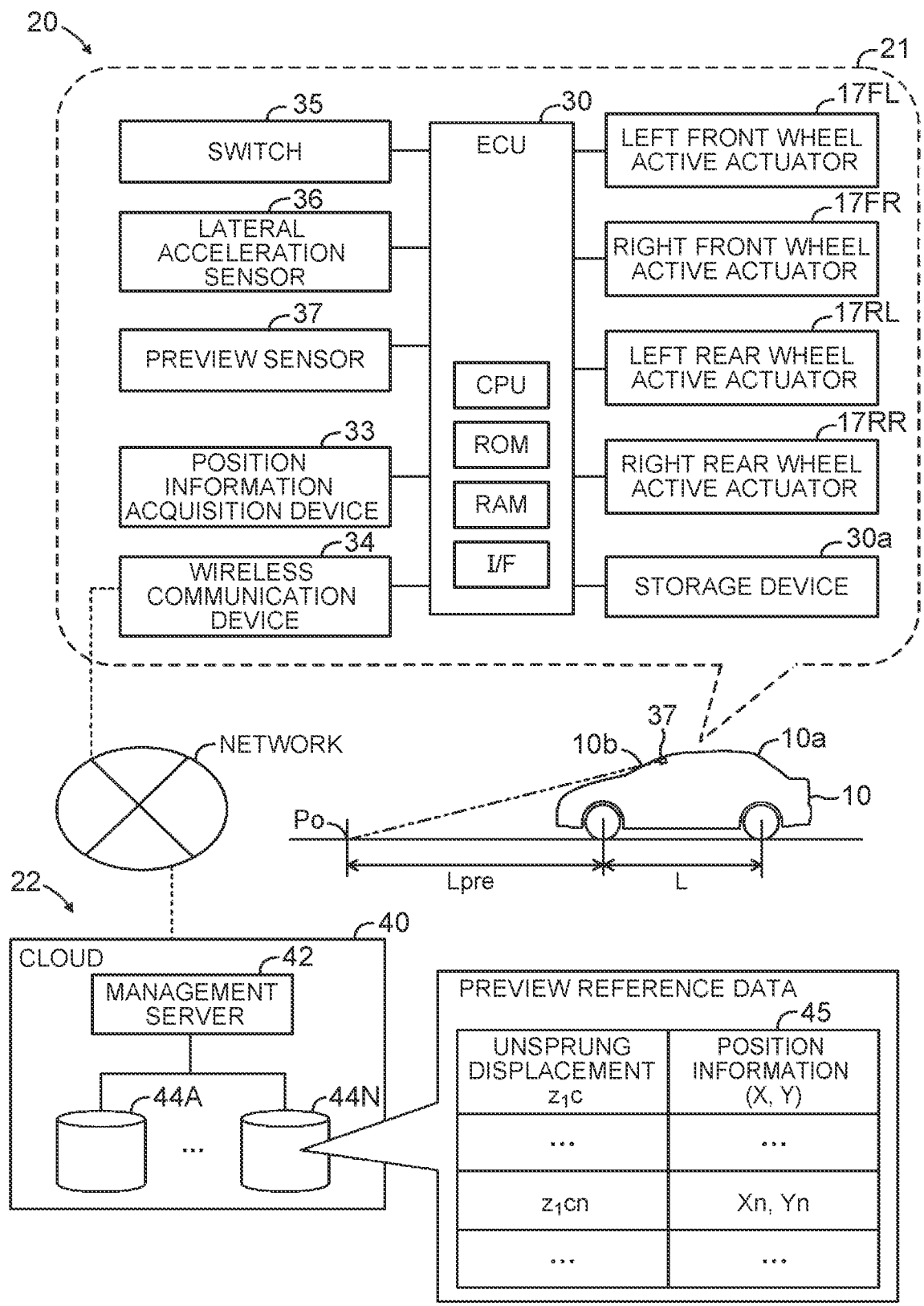
FIG. 11 illustrates a schematic configuration of a travel state control device according to a second embodiment of the present disclosure.

In the vehicle travel state control device 20 according to a second embodiment illustrated in FIG. 11, the in-vehicle device 21 is provided with a lateral acceleration sensor 36 and a preview sensor 37 in place of the steering angle sensor 31 and the vehicle speed sensor 32. The lateral acceleration sensor 36 and the preview sensor 37 are connected to the ECU 30. The lateral acceleration sensor 36 detects an actual lateral acceleration Gy of the vehicle 10. The actual lateral acceleration Gy has a positive value when the vehicle makes a left turn.

The preview sensor 37 may be any preview sensor known in the relevant technical field as long as the preview sensor can acquire a value (referred to as "road surface displacement") that represents an up-down displacement of a road surface ahead of the vehicle 10, such as a camera sensor, a LIDAR, and a radar, for example. The ECU 30 functions as a road surface displacement-related information acquisition device that acquires information related to a road surface displacement of a road surface ahead of each wheel based on the result of detection by the preview sensor in cooperation with the preview sensor 37 which is an in-vehicle sensor. Hence, in the embodiment, the vehicle-external device 22, the position information acquisition device 33, and the wireless communication device 34 may be omitted.

As illustrated in FIG. 11, the preview sensor 37 is attached to the inner surface of the upper end portion of a windshield 10$b$ of the vehicle 10 at the middle in the vehicle width direction, for example, and detects the road surface displacement $z_0$ at and around a target position $P_o$ ahead of the front wheel 11F by a preview distance Lpre. In some embodiments, the preview distance Lpre is longer than the front wheel pre-read distance Lpf (to be described later) at the time when the vehicle speed of the vehicle 10 is the maximum rated vehicle speed. While only one preview sensor 37 is illustrated in FIG. 11, a pair of preview sensors corresponding to the right and left front wheels may be provided.

Travel State Control Routine According to Second Embodiment

Figure 12:
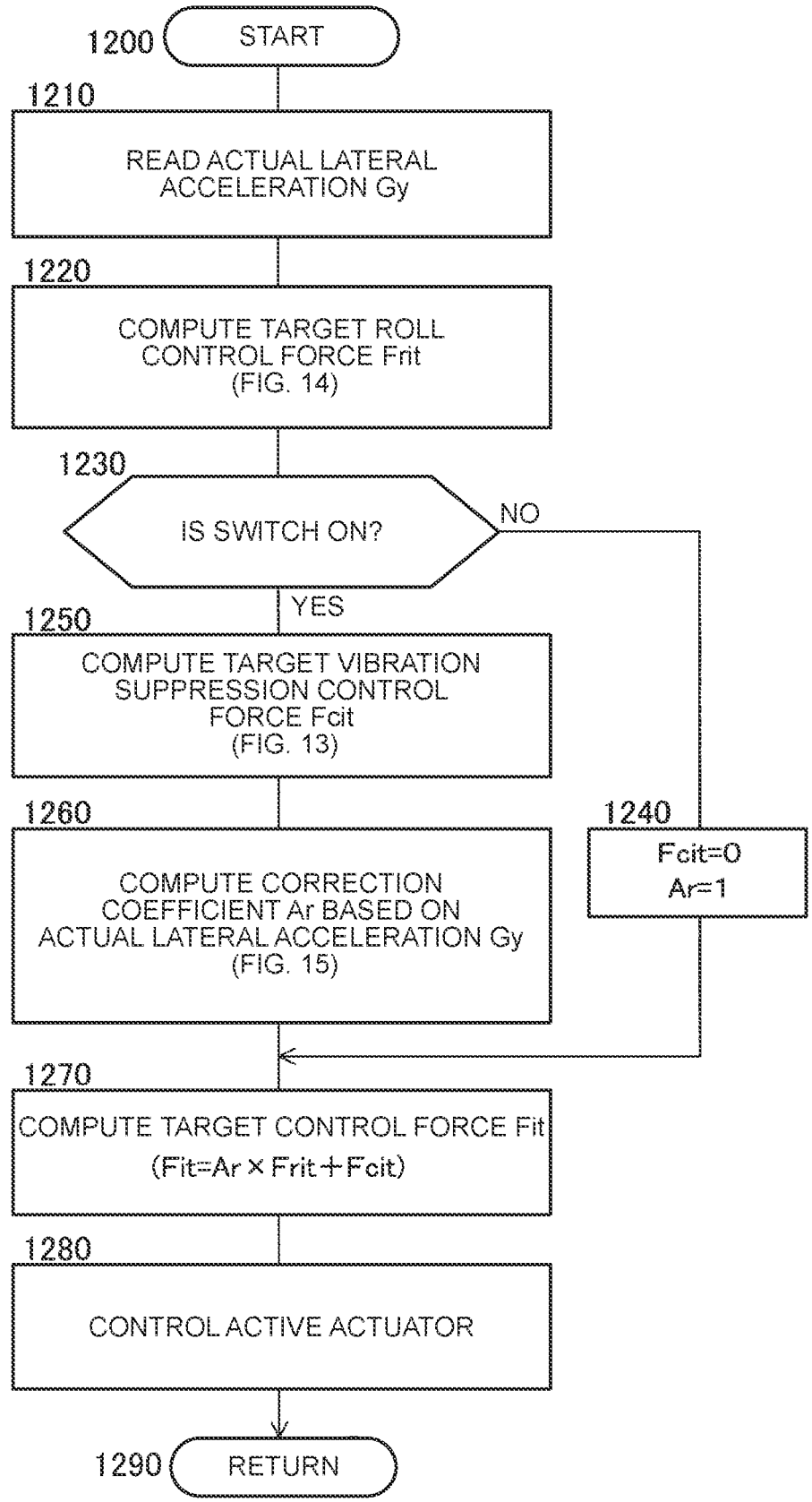
FIG. 12 is a flowchart illustrating a vehicle travel state control routine according to the second embodiment.

The travel state control is executed by the ECU 30 in accordance with a travel state control routine indicated in the flowchart in FIG. 12 at intervals of a predetermined time, as in the first embodiment.

The CPU of the ECU 30 starts the process in step 1200 in FIG. 12 at a predetermined timing, executes steps 1210 to 1280, and thereafter proceeds to step 1290 to temporarily end the routine.

Step 1210: the CPU reads an actual lateral acceleration Gy of the vehicle 10 detected by the lateral acceleration sensor 36.

Figure 14:
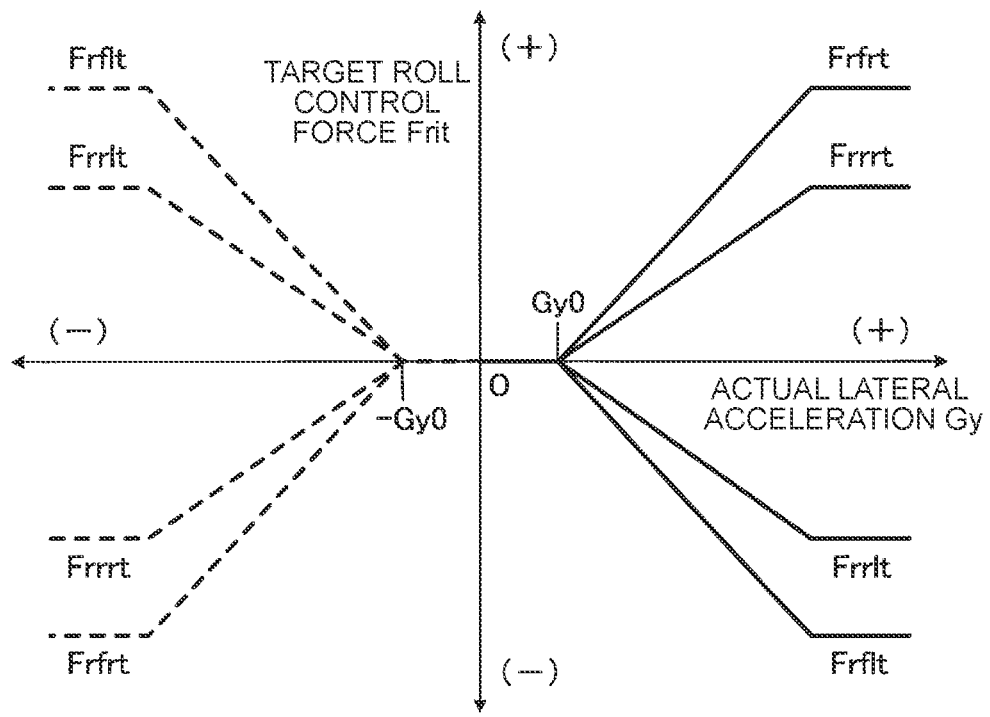
FIG. 14 illustrates a map for computing a target roll control force Frit based on an actual lateral acceleration Gy of the vehicle.

Step 1220: the CPU computes a target roll control force Frit by referencing the map illustrated in FIG. 14 based on the absolute value of the actual lateral acceleration Gy. In FIG. 14, the continuous lines correspond to a map at the time when the actual lateral acceleration Gy is positive, and the dashed lines correspond to a map at the time when the actual lateral acceleration Gy is negative. In some embodiments, the ratio of the target roll control force for the front wheels and the target roll control force for the rear wheels corresponds to the ratio between the distance Lr and the distance Lf. The distance Lr is a distance between the center of gravity of the sprung portion and the axles of the rear wheels, and the distance Lf is a distance between the center of gravity of the sprung portion and the axles of the front wheels.

As indicated in FIG. 14, the target roll control force Frit is 0 when the absolute value of the actual lateral acceleration Gy is equal to or less than Gy0 (a constant of 0 or more). When the absolute value of the actual lateral acceleration Gy is larger than Gy0, the magnitude of the target roll control force Frit becomes larger as the absolute value of the actual lateral acceleration Gy becomes larger. Hence, the target roll control force Frit is computed such that the magnitude of an anti-roll moment due to the roll control force generated by the active actuator 17 for each wheel is larger as the absolute value of the actual lateral acceleration Gy of the vehicle is larger.

Step 1230: the CPU determines whether the switch 35 is ON, and proceeds to step 1250 when the switch 35 is ON, and proceeds to step 1240 when the switch 35 is OFF.

Step 1240: the CPU sets the target vibration suppression control force Fcit for all the wheels to 0, and sets a correction coefficient Ar to 1.

Figure 13:
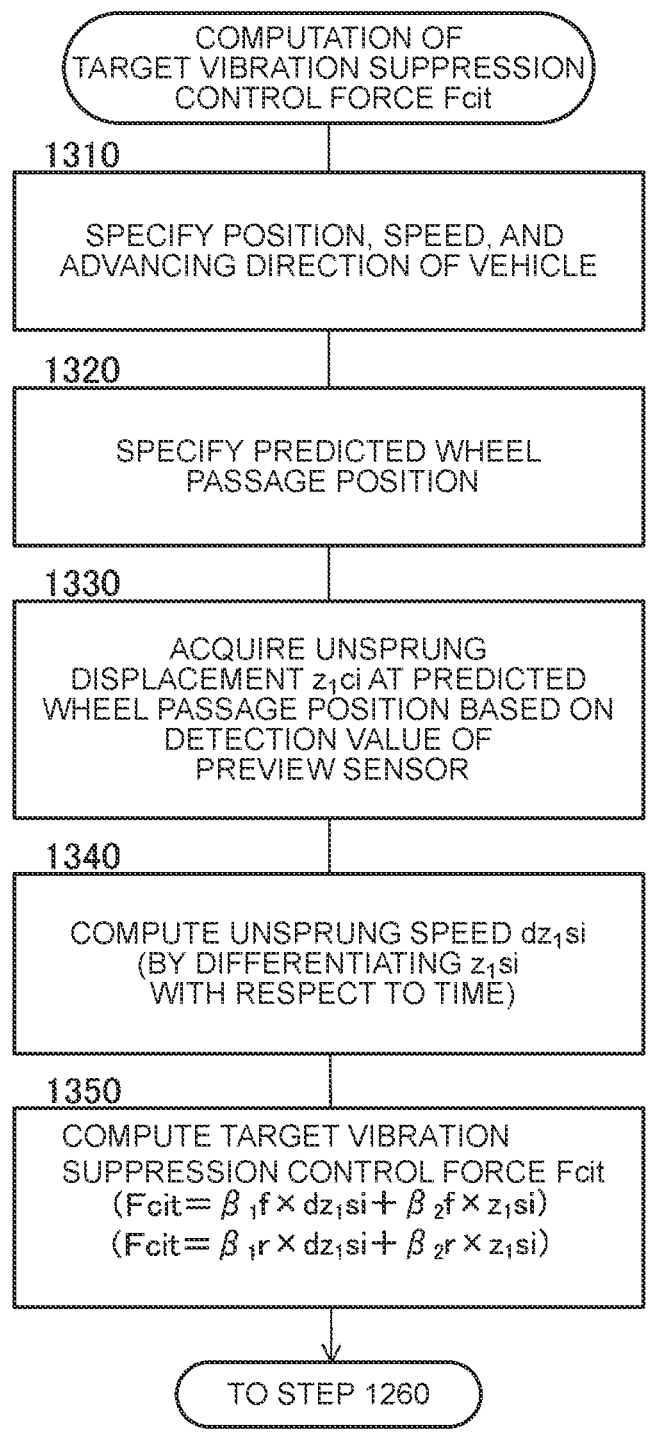
FIG. 13 is a flowchart illustrating a subroutine executed in step 1250 in FIG. 12.

Step 1250: the CPU computes a target vibration suppression control force Fcit for each wheel in accordance with the computation control routine illustrated in FIG. 13.

Figure 15:
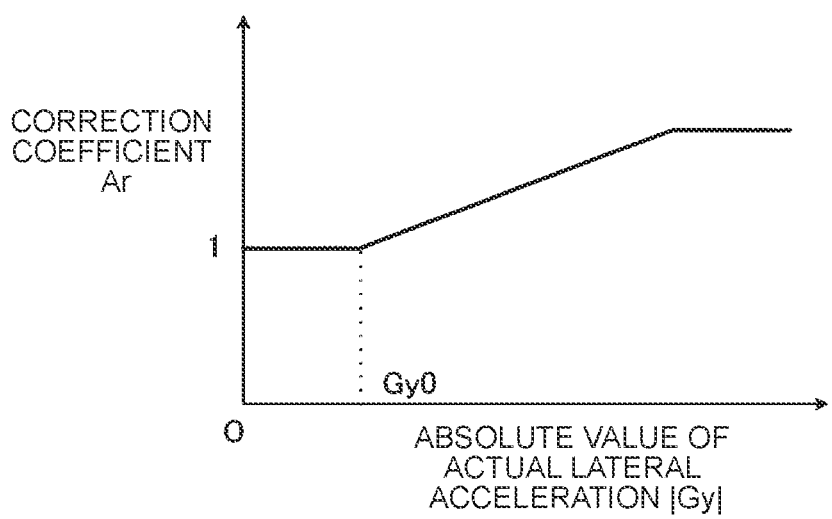
FIG. 15 illustrates a map for computing a correction coefficient Ar for the target roll control force Frit based on the absolute value of the actual lateral acceleration Gy of the vehicle.

Step 1260: the CPU computes a correction coefficient Ar for the target roll control force Frit by referencing the map illustrated in FIG. 15 based on the actual lateral acceleration Gy of the vehicle. As indicated in FIG. 15, the correction coefficient Ar is 1 when the absolute value of the actual lateral acceleration Gy is equal to or less than Gy0. The correction coefficient Ar is computed so as to have a positive value that becomes larger as the absolute value of the actual lateral acceleration Gy becomes larger when the absolute value of the actual lateral acceleration Gy is larger than Gy0.

Step 1270: the CPU computes a target control force Fit for the active actuator 17 for each wheel in accordance with the following formula (12).

$$Fit = Ar \times Frit + Fcit \quad (12)$$

Computation of Target Vibration Suppression Control Force Fcit in Step 1250

Step 1310: the CPU acquires information about the present position of the vehicle 10 from the position information acquisition device 33, and specifies (acquires) the present position of each wheel 11, the vehicle speed V1, and the advancing direction Td of the vehicle 10, as in step 810.

Step 1320: the CPU specifies a predicted front wheel movement course and a predicted rear wheel movement course as in step 820.

In step 1330, the CPU acquires the unsprung displacement $z_1 si$ at the predicted passage position of each wheel based on a road surface displacement of a road surface ahead of the vehicle detected by the preview sensor 37. In this case, the road surface displacement $z_0 si$ of the road surface at the predicted wheel passage position detected by the preview sensor 37 may be acquired as the unsprung displacement $z_1 si$. The road surface displacement of the road surface ahead of the vehicle detected by the preview sensor 37 may be temporarily stored in the RAM, and the road surface displacement $z_0 si$ of the road surface at the predicted front wheel passage position may be specified based on the stored road surface displacement to be acquired as the unsprung displacement $z_1 si$.

Step 1340: the CPU computes an unsprung speed $dz_1 si$ by differentiating the unsprung displacement $z_1 si$ with respect to the time.

Step 1350: the CPU computes a target vibration suppression control force Fcit for the active actuators 17 for the right and left front wheels and the right and left rear wheels based on the unsprung speed $dz_1 si$ and the unsprung displacement $z_1 si$ using the following formulas (13) and (14) corresponding to the above formulas (7) and (8), respectively.

$$Fcit = \beta_1 f \times dz_1 si + \beta_2 f \times z_1 si \quad (13)$$

$$Fcit = \beta_1 r \times dz_1 si + \beta_2 r \times z_1 si \quad (14)$$

With the second embodiment, as is understood from what has been described above, the ECU 30 of the travel state control device 20 increases the roll control force by performing an increase correction on the target roll control force for the roll control when the preview vibration suppression control and the roll control are executed concurrently. Hence, even when the preview vibration suppression control and the roll control are executed concurrently, it is possible to reduce the possibility that roll of the sprung portion is degraded because of the control force for the preview vibration suppression control, compared to the case where an increase correction is not performed on the target roll control force for the roll control.

With the second embodiment, in particular, the correction coefficient Ar for performing an increase correction on the target roll control force for the roll control is computed so as to be larger as the absolute value of the actual lateral acceleration Gy, which is a roll index value, is larger. Thus, the effect of the roll control is increased by a larger amount as the possibility that roll of the sprung portion becomes larger is higher. Thus, it is possible to appropriately reduce the possibility that roll of the sprung portion is degraded because of the control force for the vibration suppression control, compared to the case where the correction coefficient Ar is constant and the increase correction amount for the target roll control force is constant.

In the second embodiment (and a third embodiment to be discussed later), further, the roll index value is not an estimated value of the lateral acceleration of the vehicle, but the actual lateral acceleration Gy detected by the lateral acceleration sensor. Hence, an error in the roll control force due to the estimation and in the increase control for the roll control force can be reduced compared to the case where the roll index value is an estimated lateral acceleration of the vehicle.

In the second embodiment, the correction coefficient Ar for performing an increase correction on the target roll control force for the roll control is computed based on the actual lateral acceleration Gy which is the roll index value, and an increase correction is performed on the target roll control force by multiplying the target roll control force by the correction coefficient Ar. However, an increase correction amount ΔFrit for the target roll control force Frit may be computed based on the roll index value and the target roll control force, and the target control force Fit may be computed as the sum of the target roll control force Frit, the target vibration suppression control force Fcit, and the increase correction amount ΔFrit.

Third Embodiment

Travel State Control Routine According to Third Embodiment

Figure 16:
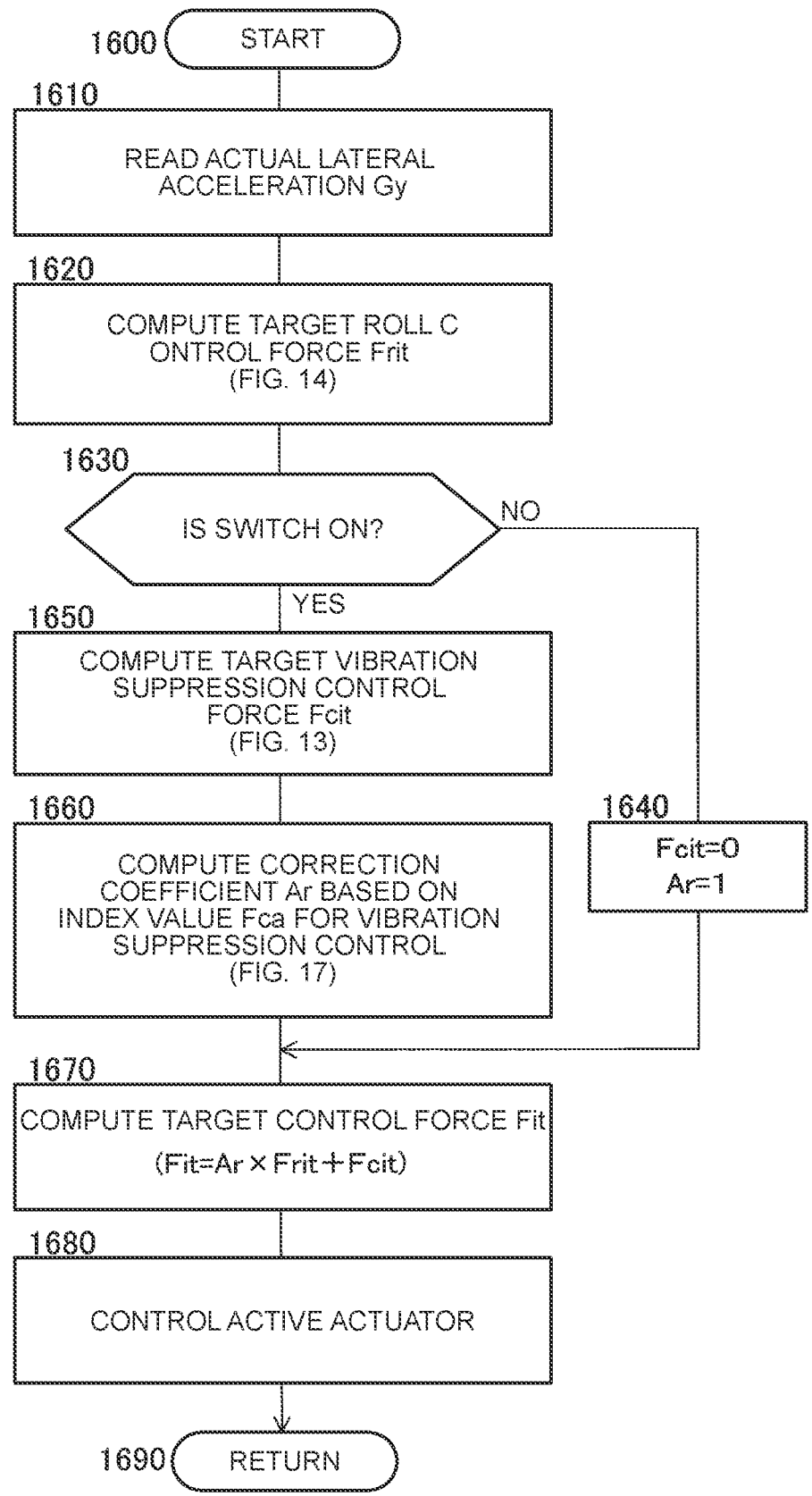
FIG. 16 is a flowchart illustrating a vehicle travel state control routine according to a third embodiment.

The travel state control according to the third embodiment is executed by the ECU 30 in accordance with a travel state control routine indicated in the flowchart in FIG. 16 at intervals of a predetermined time, as in the second embodiment.

The CPU of the ECU 30 starts the process in step 1600 in FIG. 16 at a predetermined timing, executes steps 1610 to 1680, and thereafter proceeds to step 1690 to temporarily end the routine.

As is understood from the comparison between FIGS. 16 and 12, steps 1610 to 1650 and steps 1670 and 1680 are executed in the same manner as steps 1210 to 1250 and steps 1270 and 1280, respectively, according to the second embodiment.

Figure 17:
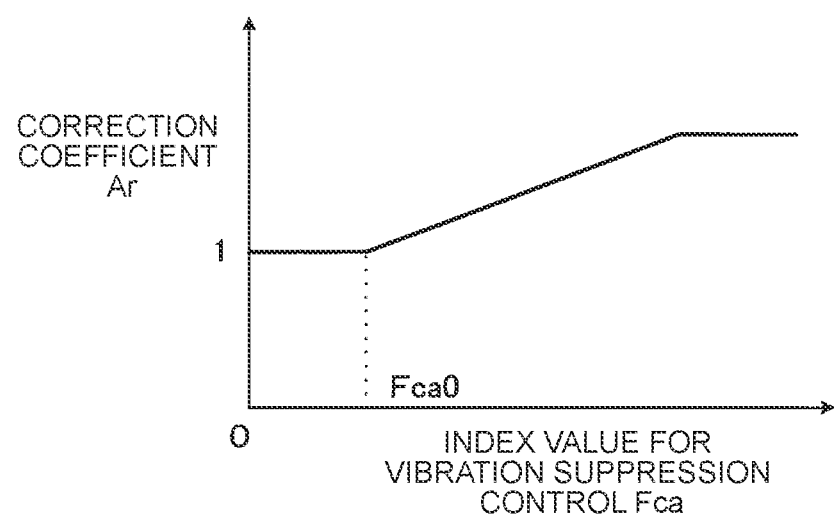
FIG. 17 illustrates a map for computing a correction coefficient Ar for a target roll control force Frit based on an index value Fca for vibration suppression control.

Step 1660: the CPU computes an index value Fca for the vibration suppression control that indicates the magnitude of a control force for the vibration suppression control, and computes a correction coefficient Ar for the target roll control force Frit by referencing the map illustrated in FIG. 17 based on the index value Fca. As indicated in FIG. 17, the correction coefficient Ar is 1 when the index value Fca is equal to or less than Fca0 (a constant of 0 or more). The correction coefficient Ar is computed so as to have a positive value that becomes larger as the index value Fca becomes larger when the index value Fca is larger than Fca0.

The index value Fca for the vibration suppression control may be a maximum value of a moving average value Fcita of the absolute value of the target vibration suppression control force Fcit for the four wheels during a predetermined time t0 (a positive constant) set in advance, or a maximum value of a peak-to-peak value PFcit of the target vibration suppression control force Fcit for the four wheels during the predetermined time t0. Alternatively, the index value Fca for the vibration suppression control may be a maximum value of a moving average value of the absolute value of the unsprung displacement for the four wheels during the predetermined time t0, or a maximum value of a peak-to-peak value of the unsprung displacement for the four wheels during the predetermined time t0.

With the third embodiment, as is understood from what has been described above, the ECU 30 of the travel state control device 20 increases the roll control force by performing an increase correction on the target roll control force for the roll control, as in the second embodiment, when the preview vibration suppression control and the roll control are executed concurrently. Hence, even when the preview vibration suppression control and the roll control are executed concurrently, it is possible to reduce the possibility that roll of the sprung portion is degraded because of the control force for the preview vibration suppression control, compared to the case where an increase correction is not performed on the target roll control force for the roll control.

With the third embodiment, in particular, the correction coefficient Ar for performing an increase correction on the target roll control force for the roll control is computed so as to be larger as the index value Fca for the vibration suppression control, which indicates the magnitude of the control force for the vibration suppression control, is larger. Hence, the effect of the roll control is increased by a larger amount as the magnitude of the control force for the vibration suppression control is larger and the possibility that roll of the sprung portion is degraded because of the control force for the vibration suppression control is higher. Thus, it is possible to appropriately reduce the possibility that roll of the sprung portion is degraded because of the control force for the vibration suppression control, compared to the case where the correction coefficient Ar is constant and the increase correction amount for the target roll control force is constant.

In the third embodiment, the correction coefficient Ar for performing an increase correction on the target roll control force for the roll control is computed based on the index value Fca for the vibration suppression control, and an increase correction is performed on the target roll control force by multiplying the target roll control force by the correction coefficient Ar. However, an increase correction amount ΔFrit for the target roll control force Frit may be computed based on the index value Fca for the vibration suppression control and the target roll control force, and the target control force Fit may be computed as the sum of the target roll control force Frit, the target vibration suppression control force Fcit, and the increase correction amount ΔFrit.

Modifications

In the first embodiment discussed above, the roll index value may be replaced with the actual lateral acceleration Gy which is detected by the lateral acceleration sensor. In the second and third embodiments, on the contrary, the roll index value may be replaced with the estimated lateral acceleration Gyh of the vehicle. In the first to third embodiments discussed above, further, the roll index value may be replaced with a roll angle of the sprung portion computed based on a stroke detected by a stroke sensor incorporated in the suspension for each wheel, for example.

In the first embodiment discussed above, the unsprung displacement $z_1 ci$ and the unsprung speed $dz_1 ci$ at the predicted wheel passage position are calculated based on the unsprung displacement $z_1$ which is acquired from the cloud 40. However, the unsprung displacement $z_1 ci$ and the unsprung speed $dz_1 ci$ at the predicted wheel passage position according to the first embodiment may be calculated based on the road surface displacement of a road surface ahead of the vehicle which is detected by the preview sensor 37, as in the second and third embodiments.

In the second and third embodiments discussed above, on the contrary, the unsprung displacement $z_1 si$ and the unsprung speed $dz_1 si$ at the predicted wheel passage position are calculated based on the road surface displacement of a road surface ahead of the vehicle which is detected by the preview sensor 37. However, the unsprung displacement $z_1 si$ and the unsprung speed $dz_1 si$ at the predicted wheel passage position according to the second and third embodiments may be calculated based on the unsprung displacement $z_1$ which is acquired from the cloud 40, as in the first embodiment.

Further, the unsprung displacement and the unsprung speed at the predicted wheel passage position according to the first to third embodiments may be computed in a manner known in the relevant technical field based on the up-down acceleration of the sprung portion and the suspension stroke, or the up-down acceleration of the unsprung portion, at the position of each wheel. Further, the unsprung displacement and the unsprung speed at the predicted wheel passage position may be computed using an observer known in the relevant technical field based on at least one of the up-down acceleration of the sprung portion, the suspension stroke, and the up-down acceleration of the unsprung portion at the position of each wheel.

In the first embodiment discussed above, a reduction correction is performed on the target vibration suppression control force for the preview vibration suppression control when the preview vibration suppression control and the roll control are executed concurrently. In the second and third embodiments, an increase correction is performed on the target roll control force for the roll control when the preview vibration suppression control and the roll control are executed concurrently. In the first to third embodiments, however, a reduction correction may be performed on the target vibration suppression control force for the preview vibration suppression control and an increase correction may be performed on the target roll control force for the roll control when the preview vibration suppression control and the roll control are executed concurrently.

In the first to third embodiments, the target roll control force Frit for the roll control for the sprung portion is computed based on the estimated lateral acceleration Gyh or the actual lateral acceleration Gy of the vehicle which is a roll index value. Roll of the sprung portion is subjected to feedforward control based on the estimated lateral acceleration Gyh or the actual lateral acceleration Gy. However, roll of the sprung portion may be subjected to feedback control based on the deviation between the roll angle of the sprung portion and a target roll angle. In this case, an increase correction for the target roll control force for the roll control may be performed through an increase correction for the feedback control amount.

Further, roll of the sprung portion may be controlled through both feedforward control and feedback control. In this case, an increase correction for the target roll control force for the roll control may be performed through an increase correction for one or both of the feedforward control amount and the feedback control amount.

While specific embodiments of the present disclosure have been described in detail above, the present disclosure is not limited to the embodiments discussed above, and it would be clear to a person skilled in the art that a variety of other embodiments may be made within the scope of the present disclosure.

For example, in the first to third embodiments discussed above, the switch 35 is provided, and the preview vibration suppression control is executed when the switch 35 is ON. However, the switch 35 may be omitted, and steps 730 and 740 may be omitted in the first embodiment, steps 1230 and 1240 may be omitted in the second embodiment, and steps 1630 and 1640 may be omitted in the third embodiment.

In the first embodiment discussed above, the preview reference data 45 need not be stored in the storage device 44 of the cloud 40, and may be stored in the storage device 30*a*.

When the travel path of the vehicle 10 is determined in advance, further, the CPU may download in advance the preview reference data 45 on the travel path from the cloud 40 before the vehicle 10 starts to travel on the travel path, and store the preview reference data 45 in the storage device 30*a*.

The unsprung speed $dz_1ci$ may be stored, in place of the unsprung displacement $z_1$, in the preview reference data 45 in correlation with position information and vehicle speed information. In this case, in step 750 indicated in FIG. 7, for example, the CPU acquires an unsprung speed $dz_1ci$, and computes the unsprung displacement $z_1ci$ by integrating the acquired unsprung speed $dz_1ci$.

The process of computing the target vibration suppression control force Fcrt for the rear wheel 11R according to the first to third embodiments is not limited to the example described above. For example, the CPU may compute the target vibration suppression control force Fcrt based on the unsprung displacement $z_1$ of the front wheel 11F at the present position at the present time tp, and transmit a control instruction including the target vibration suppression control force Fcrt to the rear wheel active actuator 17R at a timing delayed from the present time tp by a time (L/V−tpr). That is, the CPU may transmit a control instruction including the target vibration suppression control force Fcrt to the rear wheel active actuator 17R at the timing when the rear wheel 11R reaches a location before the present position of the front wheel 11F by the rear wheel pre-read distance Lpr.

Further, the CPU specifies the predicted rear wheel movement course based on the present position of the rear wheel 11R, the advancing direction Td of the vehicle 10, and position relationship data, independently of the predicted front wheel movement course, and specifies as the predicted rear wheel passage position a position away by the rear wheel pre-read distance Lpr along the predicted rear wheel movement course. Then, the CPU acquires the unsprung displacement $z_1$ at the predicted rear wheel passage position, and computes the target vibration suppression control force Fcrt for the rear wheel 11R based on the acquired unsprung displacement $z_1$.

While the vehicle speed V1 and the advancing direction Td are acquired based on the present position of the vehicle 10 which is acquired by the GNSS receiver, the present disclosure is not limited thereto. For example, the travel state control device 20 may include a "wheel speed sensor and steered angle sensor" (not illustrated), the wheel speed sensor may detect the rotational speed of the wheel 11, and the CPU may compute the vehicle speed V1 based on the rotational speed of the wheel 11. A yaw rate sensor that detects the yaw rate of the vehicle 10 may be provided, and the CPU may acquire the advancing direction Td based on the yaw rate and the vehicle speed V1.

The suspensions 13FR to 13RL may be suspensions of any type that permits mutual displacement in the up-down direction of the wheels 11FR to 11RL and the vehicle body 10*a*. Further, the suspension springs 16FL to 16RR may be springs of any type such as compression coil springs and air springs.

While the active actuators 17FR to 17RL are provided in correspondence with the wheels 11 in each of the embodiments discussed above, it is only necessary that at least one wheel 11 should be provided with one active actuator 17. For example, the vehicle 10 may include only either the front wheel active actuators 17F or the rear wheel active actuators 17R.

While the active actuator 17 is used as the control force generation device in the embodiments and the modifications described above, the present disclosure is not limited thereto. That is, it is only necessary that the control force generation device should be an actuator that can generate a control force in the up-down direction for suppressing vibration of the sprung portion 51 in an adjustable manner based on a control instruction that includes a target control force.

Further, the control force generation device may be an active stabilizer device (not illustrated). The active stabilizer device includes a front wheel active stabilizer and a rear wheel active stabilizer. When a control force (left front wheel control force) in the up-down direction is generated between the sprung portion 51 and the unsprung portion 50 corresponding to the left front wheel 11FL, the front wheel active stabilizer generates a control force (right front wheel control force) in the opposite direction of the left front wheel control force between the sprung portion 51 and the unsprung portion 50 corresponding to the right front wheel 11FR. Similarly, when a control force (left rear wheel control force) in the up-down direction is generated between the sprung portion 51 and the unsprung portion 50 corresponding to the left rear wheel 11RL, the rear wheel active stabilizer generates a control force (right rear wheel control force) in the opposite direction of the left rear wheel control force between the sprung portion 51 and the unsprung portion 50 corresponding to the right rear wheel 11RR. The configuration of the active stabilizer device is known, and incorporated herein by referencing Japanese Unexamined Patent Application Publication No. 2009-96366 (JP 2009-96366 A). The active stabilizer device may include at least one of the front wheel active stabilizer and the rear wheel active stabilizer.

The control force generation device may be a device that generates a control force F in the up-down direction using the geometry of the suspensions 13FR to 13RL, by increasing and decreasing a braking/drive force for each wheel 11 of the vehicle 10. The configuration of such a device is known, and incorporated herein by referencing Japanese Unexamined Patent Application Publication No. 2016-107778 (JP 2016-107778 A) etc. The ECU 30 computes a braking/drive force for generating the control force F corresponding to the target control force Ft using a known method.

Further, such a device includes a drive device (e.g. an in-wheel motor) that applies a drive force to each wheel 11 and a braking device (brake device) that applies a braking force to each wheel 11. The drive device may be a motor, an engine, etc. that applies a drive force to either the front wheels or the rear wheels, or the four wheels. Further, it is only necessary that the control force generation device should include at least one of the drive device and the braking device.

Further, the control force generation device may include the shock absorbers 15FL to 15RR with a variable damping force. In this case, the ECU 30 controls the damping coefficient C of the shock absorbers 15FL to 15RR such that the damping force of the shock absorbers 15FL to 15RR is varied by a value corresponding to the target vibration suppression control force Fct.

What is claimed is:

1. A vehicle travel state control device comprising:
    a control force generation device configured to generate a control force in an up-down direction for suppressing vibration of a sprung portion of a vehicle between at least a pair of right and left wheels and a vehicle body portion corresponding to positions of the wheels;
    a road surface displacement-related information acquisition device configured to acquire road surface displacement-related information related to up-down displacements of a road surface;
    a roll index value acquisition device configured to acquire a roll index value that indicates a degree of roll of the sprung portion; and
    a control unit configured to control the control force generation device based on at least one of the road surface displacement-related information and the roll index value, wherein the control unit is configured to execute vibration suppression control, in which predicted wheel passage positions through which the wheels are predicted to pass are determined, a target vibration suppression control force for reducing vibration of the sprung portion when the wheels pass through the predicted wheel passage positions is computed based on the road surface displacement-related information, and the control force generation device is controlled based on the target vibration suppression control force when the wheels pass through the predicted wheel passage positions, and roll control, in which a target roll control force for reducing the roll of the sprung portion is computed based on the roll index value and the control force generation device is controlled based on the target roll control force; and
    the control unit is configured to control the control force generation device based on the target vibration suppression control force and the target roll control force which are obtained after performing at least one of a reduction correction for the target vibration suppression control force and an increase correction for the target roll control force when the vibration suppression control and the roll control are executed concurrently.

2. The vehicle travel state control device according to claim 1, wherein the control unit is configured to determine a reduction correction amount for the target vibration suppression control force based on the roll index value for the sprung portion such that the reduction correction amount for the target vibration suppression control force is larger as a magnitude of the roll index value for the sprung portion is larger.

3. The vehicle travel state control device according to claim 1, wherein the control unit is configured to determine an increase correction amount for the target roll control force based on the roll index value for the sprung portion such that the increase correction amount for the target roll control force is larger as a magnitude of the roll index value for the sprung portion is larger.

4. The vehicle travel state control device according to claim 1, wherein the roll index value for the sprung portion is one of an estimated lateral acceleration of the vehicle, an actual lateral acceleration of the vehicle, and a roll angle of the sprung portion.

5. The vehicle travel state control device according to claim 1, wherein the control unit is configured to compute an index value for the vibration suppression control that indicates a magnitude of the control force for the vibration suppression control, and determine an increase correction amount for the target roll control force based on the index value for the vibration suppression control such that the increase correction amount for the target roll control force is larger as a magnitude of the index value for the vibration suppression control is larger.

6. A vehicle travel state control method of controlling a travel state of a vehicle by controlling a control force generation device configured to generate a control force in an up-down direction for suppressing vibration of a sprung portion of the vehicle between at least a pair of right and left wheels and a vehicle body portion corresponding to positions of the wheels, the method comprising:
    vibration suppression control including a step of acquiring road surface displacement-related information related to up-down displacements of a road surface, a step of determining predicted wheel passage positions through which the wheels are predicted to pass, a step of computing a target vibration suppression control force for reducing vibration of the sprung portion based on the road surface displacement-related information when the wheels pass through the predicted wheel passage positions, and a step of controlling the control force generation device based on the target vibration suppression control force when the wheels pass through the predicted wheel passage positions; and
    roll control including a step of acquiring a roll index value that indicates a degree of roll of the sprung portion, a step of computing a target roll control force for reducing the roll of the sprung portion based on the roll index value when the roll index value is equal to or more than a reference value, and a step of controlling the control force generation device based on the target roll control force, wherein the control force generation device is controlled based on the target vibration suppression control force and the target roll control force which are obtained after performing at least one of a reduction correction for the target vibration suppression control force and an increase correction for the target roll control force when the vibration suppression control and the roll control are executed concurrently.

* * * * *